(12) United States Patent
Saeki

(10) Patent No.: US 7,165,064 B2
(45) Date of Patent: *Jan. 16, 2007

(54) SYSTEMS AND METHODS FOR RETRIEVING DATA

(75) Inventor: Joji Saeki, Tokyo (JP)

(73) Assignee: Dynatrek, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/337,380

(22) Filed: Jan. 23, 2006

(65) Prior Publication Data

US 2006/0206312 A1 Sep. 14, 2006

Related U.S. Application Data

(63) Continuation of application No. 10/652,642, filed on Aug. 28, 2003, now Pat. No. 7,016,894, which is a continuation of application No. 09/346,778, filed on Jul. 7, 1999, now Pat. No. 6,678,674.

(30) Foreign Application Priority Data

Jul. 9, 1998 (JP) ................................. 10-194666

(51) Int. Cl.
*G06F 17/30* (2006.01)
(52) U.S. Cl. ................. 707/3; 707/2; 707/4; 707/6; 707/100; 707/102
(58) Field of Classification Search ................ 707/10, 707/100, 2–4, 6, 102
See application file for complete search history.

(56) References Cited

U.S. PATENT DOCUMENTS

| | | | |
|---|---|---|---|
| 4,819,160 A | 4/1989 | Tanka et al. | |
| 5,197,005 A | 3/1993 | Shwartz et al. | |
| 5,295,256 A | 3/1994 | Bapat | |
| 5,386,556 A | 1/1995 | Hedin et al. | |
| 5,584,024 A | 12/1996 | Shwartz | |
| 5,701,453 A * | 12/1997 | Maloney et al. | 707/2 |
| 5,918,225 A | 6/1999 | White et al. | |
| 5,937,402 A | 8/1999 | Pandit | |
| 5,974,418 A | 10/1999 | Blinn et al. | |
| 6,061,690 A | 5/2000 | Nori et al. | |
| 6,112,199 A | 8/2000 | Nelson | |
| 6,167,399 A | 12/2000 | Hoang | |
| 6,233,578 B1 | 5/2001 | Machihara et al. | |
| 7,016,894 B1 * | 3/2006 | Saeki | 707/3 |

* cited by examiner

*Primary Examiner*—Cam-Y Truong
(74) *Attorney, Agent, or Firm*—Jones Day

(57) ABSTRACT

Systems, methods, and storage mediums for retrieving data are provided. A syntax analysis is performed of a retrieval request according to data definition information in a data dictionary so as to convert the retrieval request into a query statement executable by a database. The database comprises an unnormalized data structure that violates the first, second, or third normal condition. The data definition information is for converting the unnormalized data structure to a logically normalized data structure. The data dictionary comprises display tables and logical items. A display table comprises a plurality of display items. Each display item corresponds to a logical item. The query statement is executed relative to the database so as to obtain a retrieval result. The obtained retrieval result is edited according to the data definition information so as to generate a final retrieval result.

47 Claims, 15 Drawing Sheets

| KEY CANDIDATE ITEM | ATTRIBUTE CANDIDATE ITEM |
|---|---|

< DISPLAY TABLE (a) >

| CUSTOMER | COMMODITY | SALES VOLUME | PROCEEDS |
|---|---|---|---|

< DISPLAY TABLE (b) >

| VENDOR | COMMODITY | QUANTITY OF STOCKED GOODS | MONEY FOR STOCKING |
|---|---|---|---|

< SELECTABLE ITEMS IN CASE DISPLAY TABLES (a) AND (b) ARE COMPOUNDED >

| COMMODITY | SALES VOLUME | PROCEEDS | QUANTITY OF STOCKED GOODS | MONEY FOR STOCKING |
|---|---|---|---|---|

FIG. 5

SYSTEMS AND METHODS FOR RETRIEVING DATA

This application is a continuation of U.S. patent application Ser. No. 10/652,642, filed Aug. 28, 2003 now U.S. Pat. No. 7,016,894, which is a continuation of U.S. patent application Ser. No. 09/346,778 filed Jul. 7, 1999, now U.S. Pat. No. 6,678,674 B1. This application also claims priority under 35 U.S.C. §119 to Japanese Application No. 10-194666, dated Jul. 9, 1998.

BACKGROUND OF THE INVENTION

1. Field of the Invention

The present invention generally relates to a database building technique, and more specifically, to a technique for retrieving data in a versatile manner from a database constructed in such a way as to include an unnormalized data structure.

2. Description of the Related Art

In a relational database (hereinafter referred to as "RDB") which is today's dominating database, data modeling is performed by assuming that data to be processed is normalized (namely, data redundancy is eliminated).

Normalized data can be easily retrieved by using a data manipulating language (hereinafter referred to as "DML") such as SQL. Further, many general-purpose retrieval tools have been put to practical use. However, in actual RDBs, it is difficult to achieve complete data normalization. Moreover, actual RDBs contain many unnormalized or deorganized data. Hereinbelow, conditions for normal forms according to a relation theory in RDB are shown.

(A1) Individual elements of a relation bear no relationship with one another and are atomic (first normal form condition).

(A2) Any attribute other than keys of a relation should be provided with values of all the keys when a value of the attribute is uniquely determined (second normal form condition).

(A3) When one Y of attributes X and Y of a relation is determined if the other X of the attributes is determined, the attribute X should be a key for the attribute Y (third normal form condition).

However, if these conditions are rigorously applied to a very large database, the number of necessary tables increases. Moreover, the number of joins for joining tables at a retrieving operation increases. This results in extremely reduced retrieval speed. Thus, usually, a database design permits a database to contain some unnormalized data. Hereinbelow, examples are shown wherein RDB is permitted to contain unnormalized data.

(B1) In case of retrieving data all over storage areas containing data on departments and fields, which have different data structures, respectively.

(B2) In case of hierarchically categorizing data into major, intermediate and minor classes so as to treat many kinds of data.

(B3) In case of partially accumulating data with a high frequency of use in advance so as to increase retrieval efficiency, and providing the accumulated data repeatedly.

(B4) In case of performing special processing on a small number of pieces of exceptional data according to a branch No., a flag and an identifier.

Especially, under the present conditions, the technique of employing an unnormalized data structure, which is hierarchically categorized, is heavily used as techniques of easily imparting a (non-integral) fractal dimension to the data space without impairing the whole data structure, differently from a normalized data model which handles only integral dimensions such as two-dimension and three-dimension of a data space.

Meanwhile, a logic, on which a query statement for retrieving unnormalized data is based, in the foregoing RDB has a characteristic that it is difficult to describe this logic according to a first order predicate logic assumed by ordinary DML. Practically, SQL, which is the most standard DML, has a part of multi-order logic functions such as a sub-query and HAVING clause. However, SQL has drawbacks in that these functions are weak and submit to many constraints and that logical prospects are poor. Further, the actual usage frequency of SQL is not high.

Therefore, in case of retrieving unnormalized data, it is difficult to utilize an existing general-purpose database retrieving tool which depends upon language functions attached to a database. Under the present circumstances, application programs for individual databases should be separately developed. Alternatively, primitive techniques should be employed. For example, after raw data to be processed is extracted, a user should process the raw data. Thus, there have been caused the problems that the retrieval of data requires a great deal of labor and cost and that a long processing time is required to obtain a result of the retrieval.

Further, an object-oriented database (OODB) obtained by encapsulating data and algorithms so as to be integral with one another is sometimes used to enable a local operation on data. However, even in case of employing OODB, as an amount of data is increased, a processing efficiency is reduced. Moreover, an operation of converting a data structure requires a great deal of time and effort. Thus, it is difficult to make OODB practical as a very large database.

Furthermore, in case a user directly designates complex and hard-to-understand unnormalized data stored in a database as objects to be retrieved and retrieval conditions, it is desirable that such data is represented as data of a simple data structure like a table image. Thus, in the field of OLAP (online analytical processing), an approach, by which a source data structure itself is normalized in a multi-dimensional space, is employed. Such an approach, however, has the problems that a revision of the existing data structure and data conversion require enormous work and that the entire structure is frequently changed owing to the necessity of exceptional data and retrievals thereof. Thus, such an approach is not effective in all situations.

SUMMARY OF THE INVENTION

The foregoing problems can be solved if a data structure including physically unnormalized data (hereinafter referred to as "unnormalized data structure") can be presented to a user as a logically normalized data structure (hereinafter referred to as "normalized data structure").

Therefore, it is an object of the present invention to provide a data retrieving method which enables data retrieval, in a versatile manner, from a database which is built so as to include an unnormalized data structure.

It is another object of the present invention to provide a data retrieving apparatus which is suitable for implementing the foregoing data retrieving method.

It is another object of the present invention to provide a storage medium for realizing the foregoing data retrieving method and apparatus using a general-purpose computer apparatus.

According to one aspect of the present invention, there is provided a data retrieving method comprising the steps of providing data definition information for representing an unnormalized data structure contained in a database as a logically normalized data structure; analyzing a retrieval request from a user according to the data definition information so as to convert the retrieval request into a query statement which is executable by the database; executing the query statement relative to the database so as to obtain a retrieval result; and editing the obtained retrieval result according to the data definition information so as to generate a final retrieval result corresponding to the retrieval request.

It may be arranged that the retrieval request includes a data extracting condition for restrictively specifying data to be retrieved, and that the query statement, which is executable by the database, is obtained by normalizing a logical description in the data extracting condition by a first-order predicate logic according to the data definition information.

It may be arranged that the final retrieval result is obtained by eliminating data redundancy included in the retrieval result obtained by executing the query statement.

According to another aspect of the present invention, there is provided a data retrieving apparatus comprising a database built so as to include an unnormalized data structure; a data dictionary holding definition information for representing the unnormalized data structure as a logically normalized structure; a retrieval request input section for assisting an input of a retrieval request from a user according to the data dictionary; a retrieval request translation section for analyzing the retrieval request according to the data dictionary upon completion of the input of the retrieval request so as to convert the retrieval request into one or more query statements which are executable by the database; a retrieval processing section for issuing the one or more query statements to the database so as to acquire retrieval data composed of one or more results of execution of the one or more query statements; and a retrieval data processing section for editing the retrieval data so as to generate result data corresponding to the retrieval request.

It may be arranged that the data dictionary includes the definition information to which display information selectably presented to the user when assisting the input, a query statement pattern for converting the retrieval request to the query statement which is executable by the database, and physical information in the database are related for each of logical items representing a data unit in the retrieval request.

It may be arranged that the data dictionary includes a logical sub-item for complementing the logical item, and that information on categories in a logical item type for representing the unnormalized data structure as the logically normalized data structure is defined in the logical sub-item.

It may be arranged that the retrieval request input section visibly presents the display information on data to be retrieved, according to the data dictionary, and interactively performs the selective input from the user of the retrieval request which includes an extraction condition for extracting the data to be retrieved.

It may be arranged that the retrieval request input section designates a display format of the result data, the display format included in the retrieval request.

It may be arranged that the retrieval request input section generates the result data from a plurality of display items, which are selected by the user from the display information, such that the plurality of display items employing a common display item as a key item are compounded into the result data.

It may be arranged that the retrieval request input section dynamically adds information on the logical item type used for a logical description in an extraction condition to the data dictionary.

It may be arranged that the retrieval request translation section performs a syntax analysis of the retrieval request according to the data dictionary to replace a retrieval request syntax pattern of the retrieval request with a corresponding query statement pattern which is executable by the database.

It may be arranged that the retrieval request translation section converts the retrieval request into the one or more query statements which are normalized according to a first order predicate logic in a data manipulation language based on predetermined SQL.

It may be arranged that the retrieval request translation section expands all the display items included in the retrieval request according to the data dictionary and converts the expanded display items into corresponding logical items, respectively, and that the retrieval request translation section removes data redundancy in the retrieval request by performing one of column integration for integrating different physical items, which compose the physical information, into a same logical item according to an extraction condition, column decomposition for decomposing a same physical item into different logical items, row selection for selecting a single logical item, whose content does not overlap with those of other items, from physical items whose contents overlap with those of other physical items, and key value selection for selecting different physical items according to a key value and aggregating the different physical items to a single logical item, and converts the retrieval request into the one or more query statements normalized according to a first order predicate logic in a data manipulation language based on predetermined SQL.

It may be arranged that the retrieval data processing section removes a redundant part by integrating items formed from a same logical item in the retrieval data corresponding to the one or more query statements.

It may be arranged that the retrieval data processing section performs data processing and tabulation on the retrieval data according to designation of a display format concerning the result data when the designation of the display format is included in the retrieval request.

It may be arranged that the database is constructed as a predetermined object-oriented database.

According to another aspect of the present invention, there is provided a data retrieving system comprising the data retrieving apparatus according to claim 4 and a plurality of retrieval request source devices, wherein the data retrieving apparatus is bidirectionaly communicably connected to the retrieval request source devices, and wherein the data retrieving apparatus is constituted so as to acquire a retrieval request issued from each of the retrieval request source devices and transmit a corresponding retrieval result to the corresponding retrieval request source device.

It may be arranged that the retrieval request is inputted to the data retrieving apparatus through an agent function.

According to another aspect of the present invention, there is provided a storage medium storing a program which is executable by a computer apparatus comprising a database built so as to include an unnormalized data structure, and a data dictionary holding definition information for representing the unnormalized data structure as a logically normalized structure, the program causing the computer apparatus to execute the steps of: assisting an input of a retrieval request from a user according to the data dictionary: analyzing the retrieval request according to the data dictionary upon completion of the input of the retrieval request so as to convert the retrieval request into one or more query statements which are executable by the database; issuing the one or more query statements to the database so as to acquire retrieval data composed of one or more results of execution of the one or more query statements; and editing the retrieval data so as to generate result data corresponding to the retrieval request.

BRIEF DESCRIPTION OF THE DRAWINGS

The present invention will be understood more fully from the detailed description given hereinbelow, taken in conjunction with the accompanying drawings.

In the drawings:

FIG. 5 is a conceptual diagram illustrating an operation of compounding data from items that are selected from a plurality of display tables according to the preferred embodiment of the present invention;

DESCRIPTION OF THE PREFERRED EMBODIMENT

Now, a preferred embodiment of the present invention will be described in detail by referring to the accompanying drawings.

Figure 1:
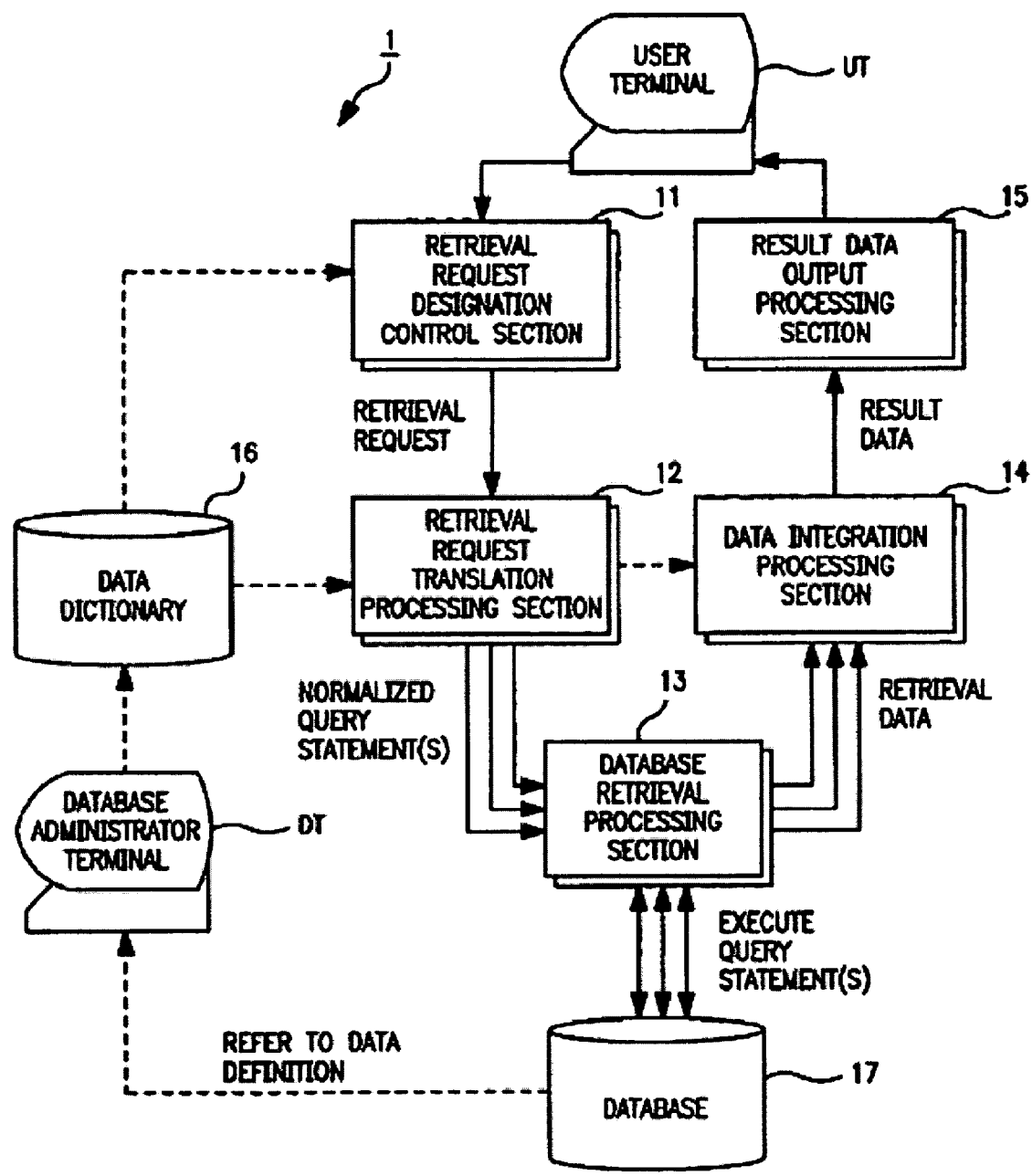
FIG. 1 is a functional block diagram illustrating a data retrieving apparatus according to a preferred embodiment of the present invention.

FIG. 1 is a functional block diagram illustrating a data retrieving apparatus 1 according to the preferred embodiment of the present invention. In FIG. 1, solid lines represent a process flow, and dashed lines represent a flow of control data.

The data retrieving apparatus 1 implemented by a computer apparatus has a database 17 built in such a manner as to contain an unnormalized data structure in an internal or external storage device of the computer apparatus, and has a data dictionary 16 constructed in such a way as to include definition information to be used for representing the unnormalized data structure as a logically normalized data structure. The data retrieving apparatus 1 further comprises a retrieval request designation control section 11, a retrieval request translation processing section 12, a database retrieval processing section 13, a data integration processing section 14 and a result data output processing section 15 which are respectively represented by functional blocks shown in FIG. 1 and which are formed when a CPU of the computer apparatus reads and executes predetermined programs.

The data retrieving apparatus 1 may have an arbitrary configuration. For instance, only input-output related functions of the retrieval request designation control section 11 and the result data output processing section 15 may be implemented in a computer apparatus to be used as a user terminal UT. Functions of the database retrieval processing section 13 may be implemented in a database server which stores the database 17. Functions of the other sections may be implemented in an application server dedicated thereto. The computer apparatuses may be connected to one another through a local area network or a wide area network so as to be operated cooperatively.

The foregoing programs and data may be stored, for example, in portable storage media, such as CD-ROMs and FDs, which can be separated from the computer apparatuses, or in a program server connected to the network. Further, the programs and data may be read therefrom and installed in internal storage devices of the foregoing computer apparatuses or in external storage devices.

The retrieval request designation control section 11 controls the visual display on the screen of the user terminal UT according to the data dictionary 16 (to be described later), i.e. performs navigation for user, operations such as selection of an object to be retrieved, designation of retrieval conditions, designation of a display format and designation of a retrieval method. The control section 11 also issues a retrieval request based on an instruction received from a user. Display on the screen of the user terminal UT is controlled according to a virtual data structure based on the definition information that is described in the data dictionary 16. In case of displaying data such as a code table, an operation of displaying thereof is actually performed by converting original data.

Figure 2:
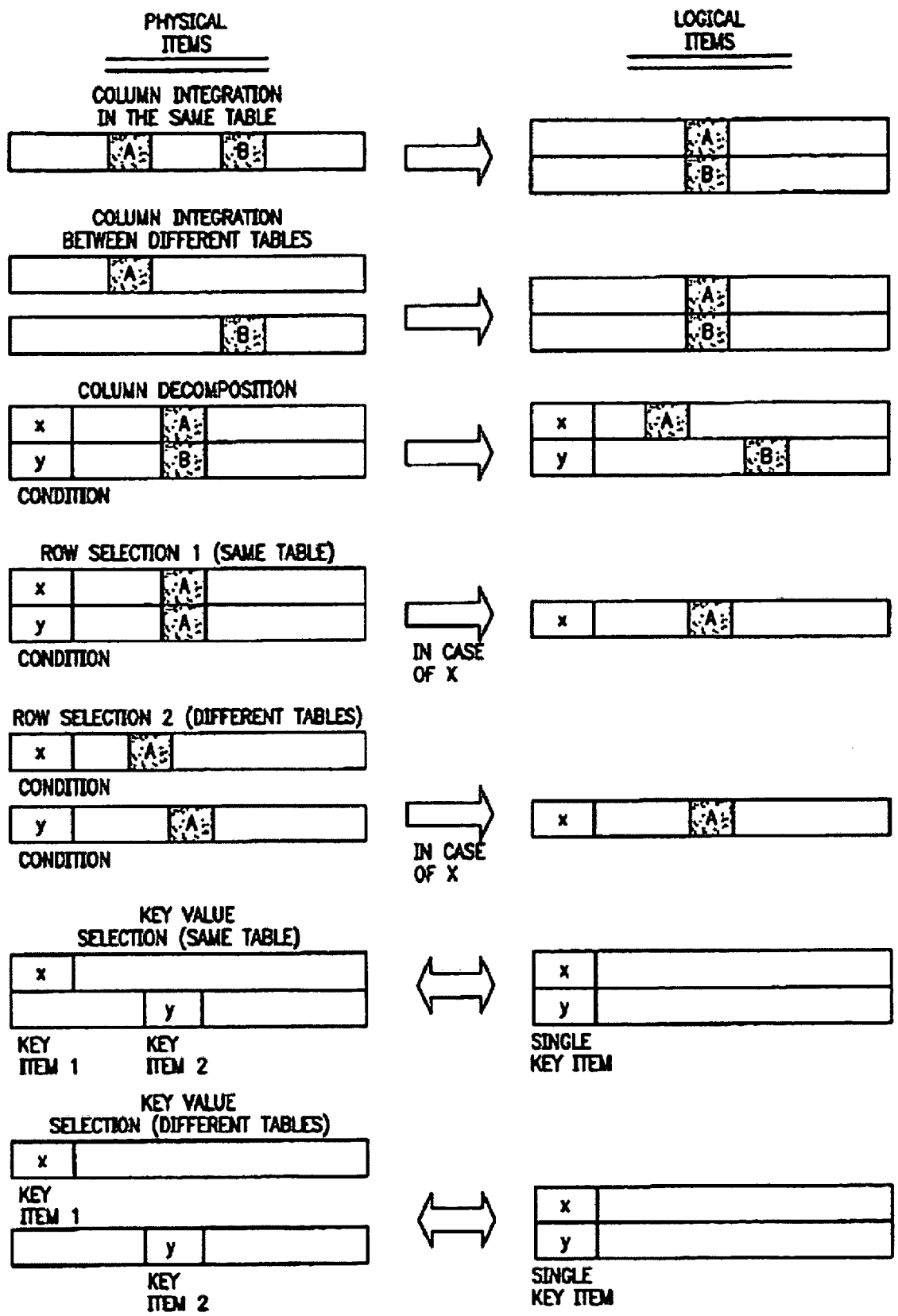
FIG. 2 is a conceptual diagram illustrating a data structure conversion pattern according to the preferred embodiment of the present invention.

The retrieval request translation processing section 12 translates a retrieval request, which is issued from the retrieval request designation control section 11, into a query statement which can be executed by the database according to various kinds of definition information described in the data dictionary 16. The retrieval request translation processing section 12 has data conversion functions as illustrated in FIG. 2. Specifically, these data conversion functions include a column integration function of integrating different physical items into a same logical item according to directions from a user which are described in a retrieval request, a column decomposition function of decomposing a same physical item into different logical items according to certain conditions, a row selection function of selecting a single logical item, whose content does not overlap with those of the others, from physical items, whose contents overlap with one another, according to certain conditions, and a key value selection function of selecting different physical items according to a key value and aggregating these physical items to a single logical item. The retrieval request translation processing section 12 is constituted so as to generate one or more normalized query statements, which can be executed by using a first-order predicate logic, from a retrieval request.

The database retrieval processing section 13 executes one or more normalized query statements, generated by the retrieval request translation processing section 12, relative to the database 17, thereby obtaining retrieval results.

The data integration processing section 14 integrates a plurality of intermediate retrieval results, which are generated in a divided manner in processes performed by the database retrieval processing section 13, into one table. The data integration processing section 14 also generates a final retrieval result, which is compliant with the directions in the retrieval request, by performing additional data processing, which cannot be described only by using a first-order predicate logic, according to various kinds of definition information described in the data dictionary 16. In the following description, a retrieval result obtained in the database retrieval processing section 13 will be referred to as "retrieval data", while a final retrieval result obtained in the data integration processing section 14 will be referred to as "result data".

The result data output processing section 15 outputs to the user terminal UT the result data generated through the foregoing processes corresponding to the directions issued from the user.

In the data dictionary 16, various kinds of definitions in the database 17 from which data is retrieved, and definition information concerning data processing structure and method for performing the functions intrinsic to the data retrieving apparatus 1 are described. The data dictionary 16 working as a nucleus of the control in the data retrieving apparatus 1 realizes a virtual data structure serving as a higher order layer, which facilitates the user's understanding and data manipulation. The data dictionary 16 is created and edited by a database administrator using a database administrator terminal DT and is managed in a centralized manner.

Figure 3:
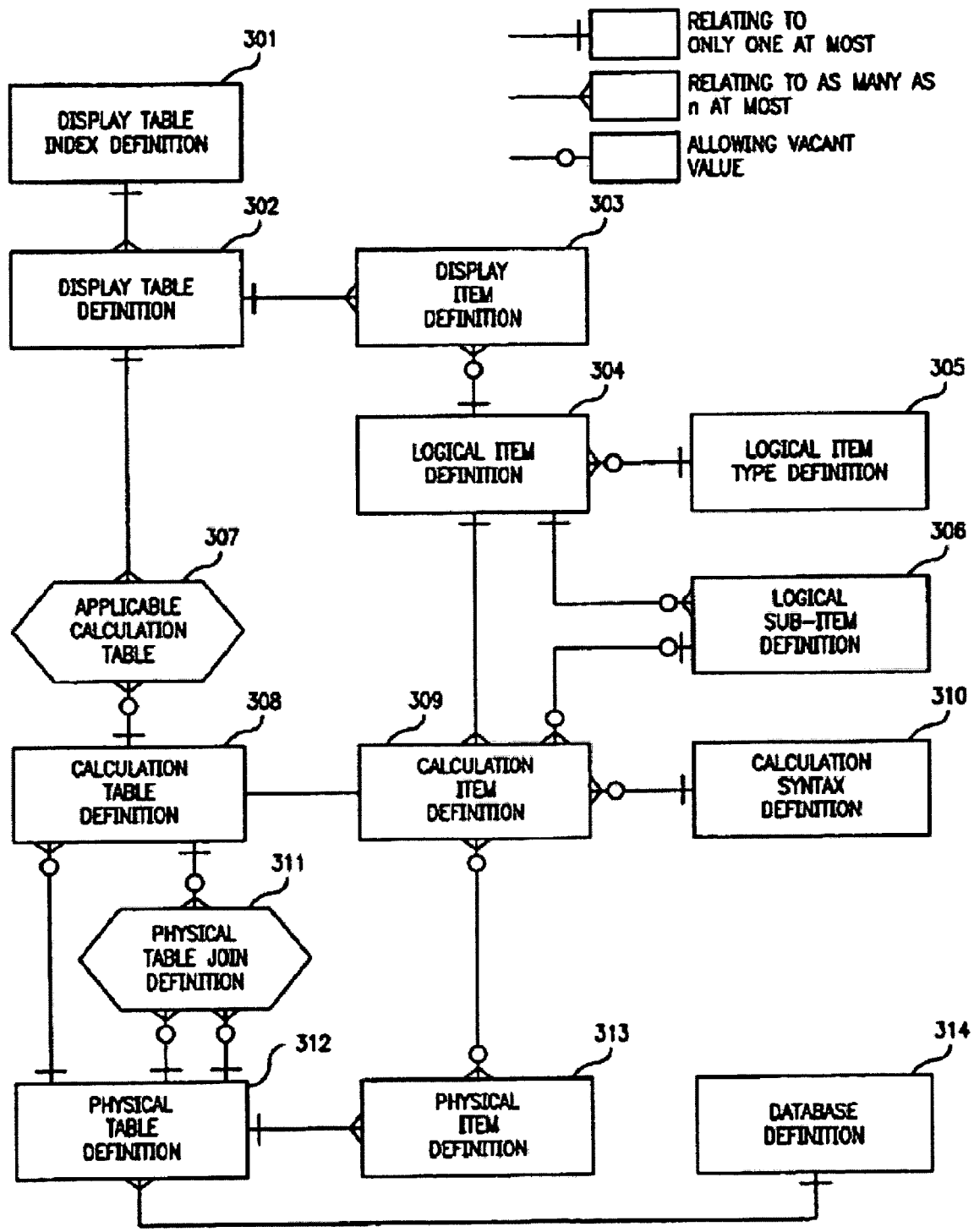
FIG. 3 is a conceptual diagram illustrating a data structure employed in a data dictionary according to the preferred embodiment of the present invention.

Now, a data structure in the data dictionary 16 of this embodiment will be described hereinbelow with reference to FIG. 3.

A display table index definition 301 provides definition information on the definition of an index in a display table constructed so that a user can easily select a desired object to be retrieved from a database. Practically, the display table index definition 301 is suitably constituted so as to have an arbitrary manner, such as a tree structure, an associative structure and a list of data arranged in Japanese syllabary order, corresponding to uses and purposes of the database.

A display table definition 302 provides definition information on a definition in a display table which is a set of display items that can be simultaneously retrieved by a user. The user narrows down retrieval objects by selecting one or more display tables.

A display item definition 303 provides definition information on definitions in individual display items contained in each of the display tables. Each of the display items is related to one of the logical items without exceptions. When a plurality of display tables are selected, different display items related to a same logical item are treated as a same display item. This logical item is the most important element in the data dictionary 16, which is described in a logical item definition 304, and is the unit of data in a retrieval request from a user, and is the unit of retrieval data provided as a result of retrieval from the database. Further, each of the logical terms is completely independent of the other logical terms and does not have a structure. Thus, a relationship is freely established between a display item which is visibly presented to a user, and a calculation or calculated item which is actually retrieved from the database.

According to the logical item definition 304, logical items are classified into key candidate items and attribute candidate items. Key candidate items are used as logical items for discrimination in setting extraction conditions and designating the grouping of data in a retrieval request. The key candidate items are also treated as a header of result data. Further, the attribute candidate items are logical items on which set operations such as an accumulating operation is performed. Furthermore, the attribute candidate items are treated as a body of result data. Moreover, the logical item definition 304 includes the descriptions of an extraction condition setting method, parameters such as a reference code table for controlling a retrieval request designation, a format editing method, and methods of processing and editing result data such as default values.

A logical item type definition 305 describes definitions for registering the types of logical items that can be handled by the data retrieving apparatus 1. The foregoing logical item definition 304 is related to one of the logical item type definition 305. The data retrieving apparatus 1 has functions including an algorithm depending on the logical item type and is constructed so that a display indicated on the screen can be dynamically changed according to this logical item type. Further, a logical item type can be dynamically added in response to users' needs by producing a program part, which uses a logical-item-type dependent algorithm, as an add in external module. Such logical item types include a numerical type, a currency type, a character string type, a code type, a hierarchical code type, a time type, a postal code type, a telephone number type, a voice type, an image type and a dynamic image type.

A logical sub-item definition 306 complements the logical item definition 304 and provides definition information corresponding to individual logical items in case the treatment of a logical item varies according to, for example, an item value or an item value pattern. Practically, in case the logical item type is the hierarchical code type, a user designates a category of the major class to thereby cause the apparatus to display a list of categories of the intermediate class, which are related to the designated category. Then, the user further designates a category of the intermediate class to thereby cause the apparatus to display a list of categories of the minor class related thereto. The logical sub-item definition 306 includes information on the definitions of categories of the major, intermediate and minor classes, and information on definitions for establishing the relations among the categories of these classes. Incidentally, selection condition values related to the logical sub-items may be specific values, a specific range of values, a specific value pattern, or a set of specific value patterns, or a combination of these values and patterns.

An applicable calculation table 307 provides definition information on the definition of a calculation table, which can be applied to a specific display table when data is retrieved therefrom. In this case, a plurality of calculation tables can be related to one display table. Further, the apparatus can establish the definitions of a (serial) relation, by which data is not retrieved from calculation tables other than the applied calculation table, and a (parallel) relation by which data may be retrieved from the calculation tables other than the applied calculation table. Moreover, the apparatus can establish the definition of the combination between the serial and parallel relations, which includes a nest.

A calculation table definition 308 provides definition information on the definition of a set of calculation items that can be simultaneously calculated. The number of issuances of database query statements is optimized by grouping the calculation items, which are contained in the calculation table, according to the definition information.

A calculation item definition 309 provides definition information concerning a calculation syntax and a calculation definition expression used in a practical method of calculating items from the database 17. It is assumed that only one calculation item definition is defined correspondingly to each logical item in every calculation table at most and that, when a calculation item is not defined, a corresponding logical item cannot be calculated according to a corresponding calculation table. Moreover, in case a logical item has a logical sub-item, a calculation item may be related to the logical sub-item so that a calculation item is effective only when the logical item has a specific logical item value.

A calculation syntax definition 310 provides definition information on the definition of a language syntax, which is established as a pattern including a variable. A database query statement is generated by automatically replacing a variable part of a syntax pattern with an effective expression according to a result of analysis of a retrieval request.

A physical table join definition 311 provides definition information on the definition of join conditions for establishing a join between a reference physical table and a join physical table when the join physical table is used. Practically, in the foregoing calculation table definition 308, one physical table to be used as a default reference physical table is related to an arbitrary number of other physical tables that are used as join physical tables to be complementarily referred to when the reference and join physical tables are joined. According to this definition information, join conditions for joining necessary physical tables are automatically added when a database query statement is generated.

A physical table definition 312 provides definition information on a definition which is the same as the definition of a list (or a table) that is stored in and retrieved from the database 17, or on a copy of a necessary part of such a definition.

A physical item definition 313 provides definition information on a definition which is the same as the definition of an item (or a field) and the attribute thereof that are stored in a physical table, or on a copy of a necessary part of such a definition.

A database definition 314 provides definition information on the definitions of a connecting procedure for connecting the apparatus to the database 17 from which data is retrieved, kinds of data types which can be handled by the database 17, kinds of functions provided in the database 17, and information peculiar to the database 17.

Now, the details of the individual functional blocks in the data retrieving apparatus 1 will be described hereinbelow.

Figure 4:
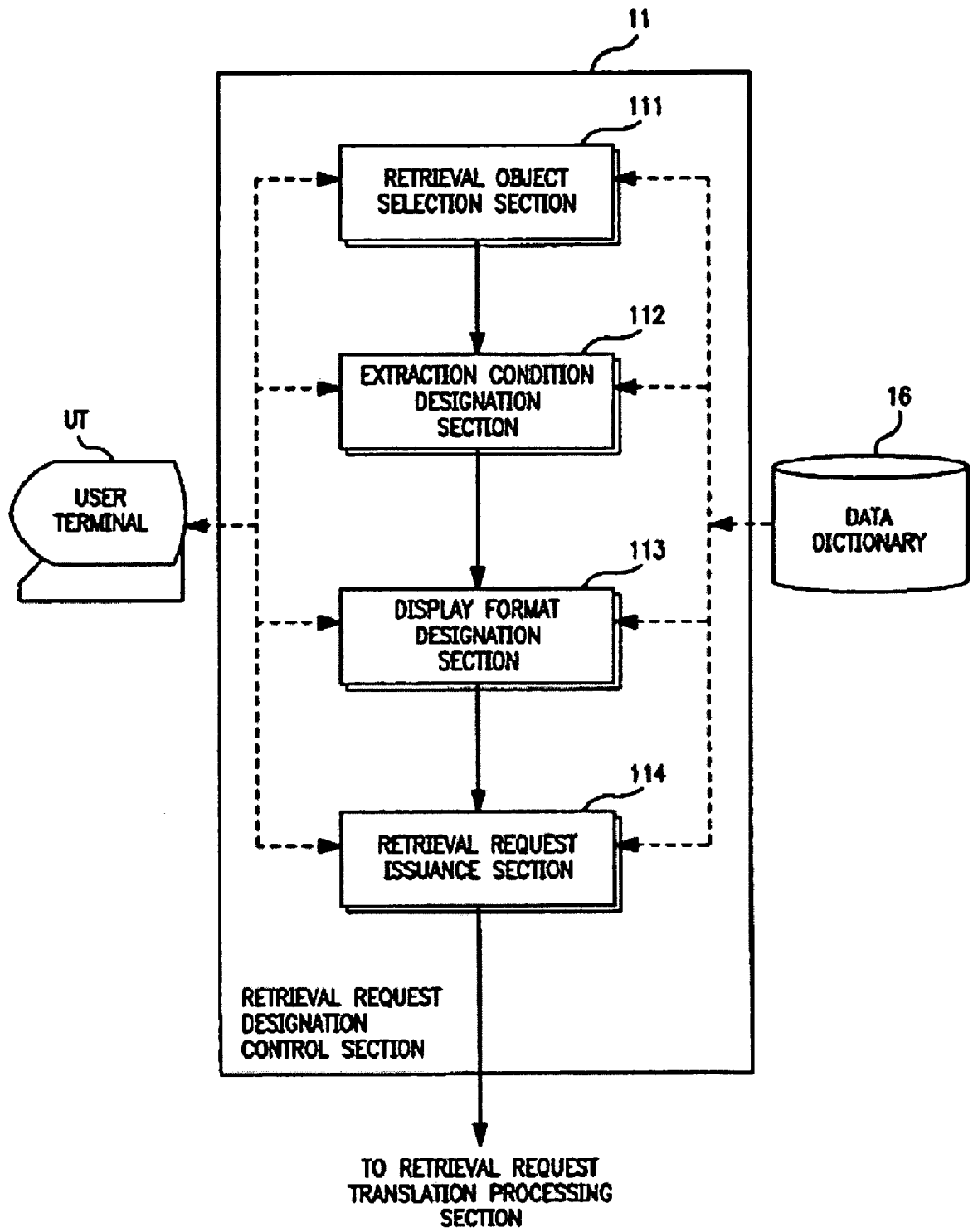
FIG. 4 is a functional block diagram illustrating a retrieval request designation control section according to the preferred embodiment of the present invention.

FIG. 4 is a functional block diagram illustrating functional blocks in the retrieval request designation control section 11. The retrieval request designation control section 11 comprises a retrieval object selection section 111, an extraction condition designation section 112, a display format designation section 113 and a retrieval request issuance section 114.

In the retrieval object selection section 111, a user first selects a specific display table by using a display table index. Moreover, the user selects a display item from the selected display table. This selection process enables the apparatus to simultaneously select items from a plurality of display tables and generate compound result data according to the data structure defined in the data dictionary 16. FIG. 5 is a conceptual diagram illustrating an operation of compounding selected items, which is performed in the retrieval object selection section 111. Only those items, such as "commodity", which are common to a plurality of tables (a) and (b) shown in FIG. 5, are effective as key candidate items in case the plurality of display tables (a) and (b) are selected. Further, in case of a table (c) shown in FIG. 5, which is obtained by compounding the tables (a) and (b) all attribute candidate items such as "sales volume", "proceeds", "quantity of stocked goods" and "quantity of money used to stock", which are contained in the respective display tables, can be freely selected.

In the extraction condition designation section 112, the extraction conditions corresponding to the selected key candidate item are designated. Practically, many screen images for setting pattern extraction conditions are prepared. Users can easily designate extraction conditions by selectively displaying an optimum screen image according to the logical item type of each item. For example, in case of the code type item, a user can select a specific code from a displayed list and designate the specific code by retrieving and displaying code tables, which are designated by the data dictionary 16, from the database 17. Similarly, in case of the hierarchical code items of the major, intermediate and minor classes, the hierarchical list of codes can be displayed by defining the data dictionary 16 so that tables and items are selected by determining a designated key value.

In case of point-in-time items, the conditions can be visually set according to time-series information by providing, for instance, a calendar or a clock in the apparatus. Further, a program, which is used to generate a screen image and uses an algorithm, for setting an optimum extraction condition corresponding to a specific item is separately produced and dynamically added as an add-in program. Consequently, the apparatus realizes easiness and operability with which such a program can be executed as if this program were a specialized one.

In the display format designation section 113, a user can designate the display format of a result of retrieval, for example, a title representing a result of retrieval, the direction of an item list (namely, a row direction or a column direction), an order of the list (namely, an ascending order or a descending order), a total or subtotal, and a maximum number of displayable rows.

The retrieval request issuance section 114 sets a sequence of commands according to data designated by a user in each of the foregoing functional blocks and then sends the set sequence of commands to the retrieval request translation processing section 12 as a retrieval request. The description format of a retrieval request includes a list of items to be retrieved, a table list to be retrieved, the designation of extraction conditions, the designation of the grouping of items, the designation of a sorting order, the destination of output of a retrieval result, and the designation of a format for displaying a retrieval result. Further, a syntax obtained by extending a standard SQL syntax may be used. Alternatively, a specialized syntax may be used.

Now, the retrieval request translation processing section 12 will be described hereinbelow.

Figure 6:
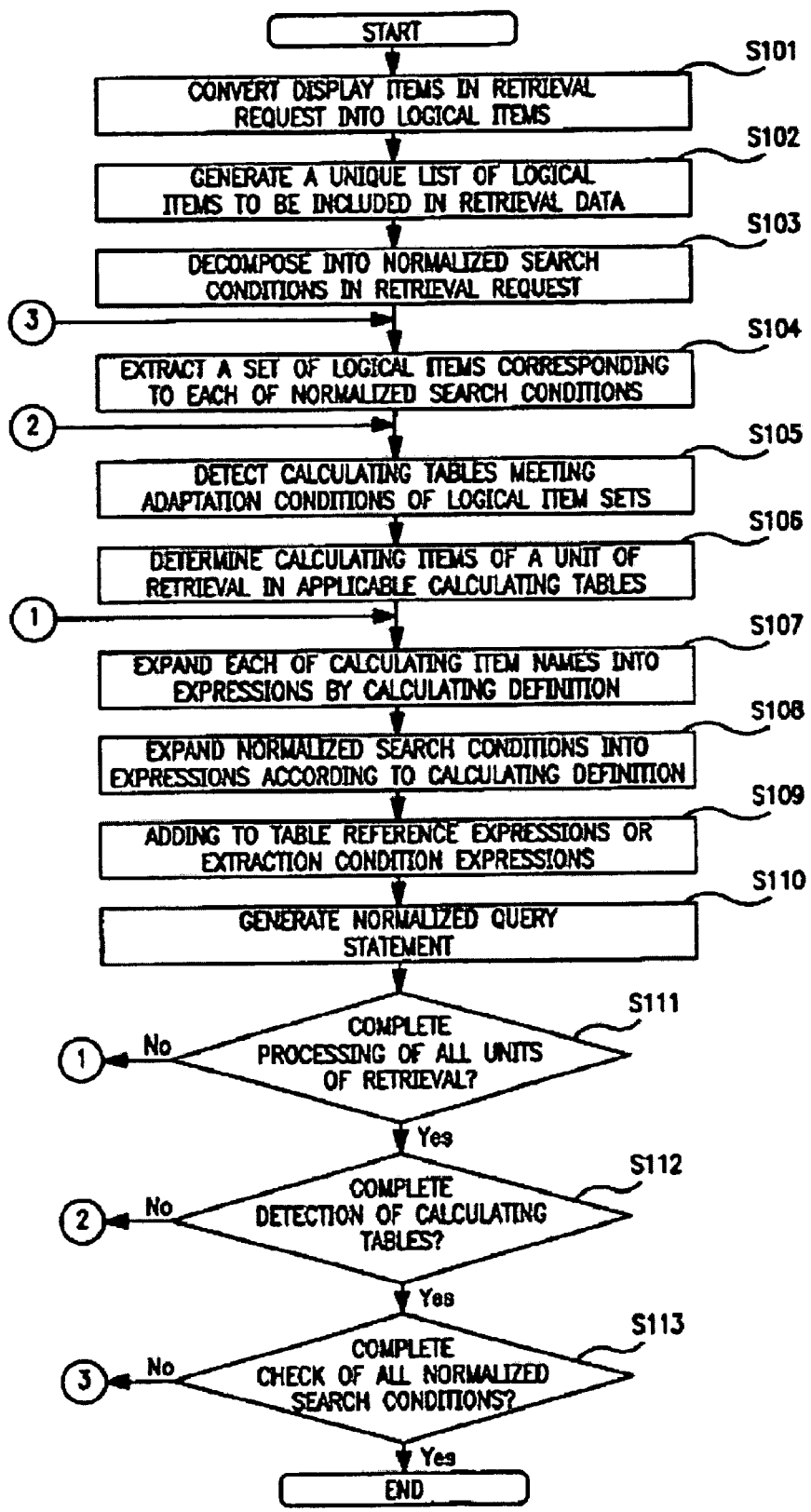
FIG. 6 is a flowchart illustrating a procedure to be executed in a retrieval request translation processing section according to the preferred embodiment of the present invention.
Figure 7:
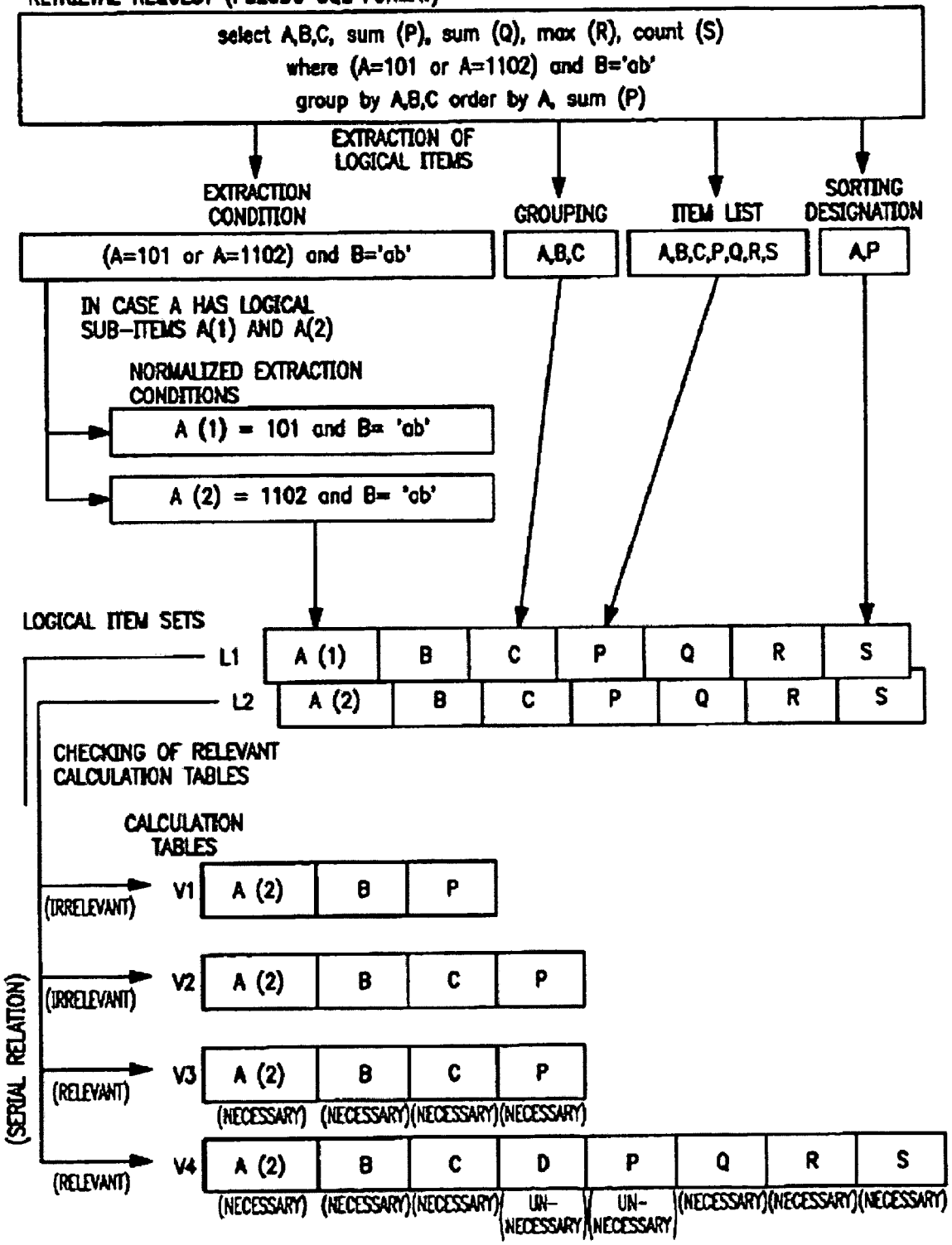
FIG. 7 is a conceptual diagram illustrating data retrieval performed in the retrieval request translation processing section.
Figure 8:
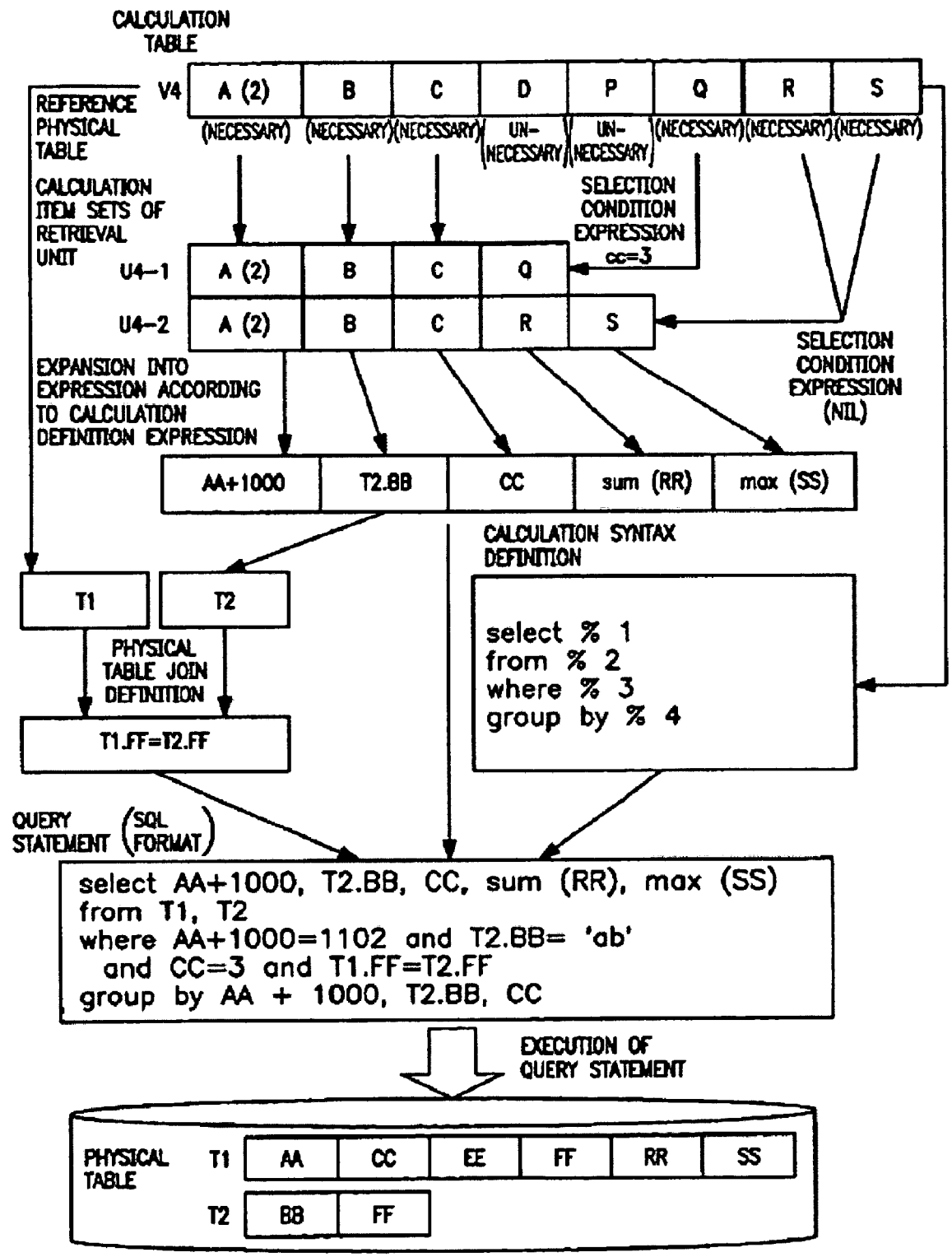
FIG. 8 is a conceptual diagram illustrating data retrieval performed in the retrieval request translation processing section.

FIG. 6 is a flowchart illustrating a procedure to be executed in the retrieval request translation processing section 12. Further, FIGS. 7 and 8 are schematic diagrams illustrating retrieval processes to be performed in the retrieval request translation processing section 12. As shown in FIG. 6, in case the inputted retrieval request describes data processing definitions and format edition definitions of all display items appearing in the item list, the designation of the grouping and the designation of the sorting, the retrieval request translation processing section 12 expands these definitions according to the corresponding definition information to thereby convert these definitions into logical items (step S101). Further, the retrieval request translation processing section 12 eliminates redundant logical items and generates a unique list of logical items to be included in retrieval data (step S102).

An upper-right part of FIG. 7 illustrates this process. Further, in this figure, display items corresponding to the extraction condition "((A=101 or A=1102) and B='ab')" included in the retrieval request are converted into logical items. Moreover, in case a logical item having a logical sub-item is included in the extraction condition (A has A(1) and A(2)), the extraction condition is decomposed into sets of a same logical sub-item and condition values by retrieving the condition values and finding logical sub-items corresponding to each of the condition values. Furthermore, in case OR condition is nested by AND condition, the extraction condition is decomposed into a plurality of normalized extraction conditions, each of which consists of AND conditions and does not have different-level logical sub-items, by removing the OR condition after the former extraction condition is converted by simultaneously maintaining logical equivalence so that the OR condition is a highest hierarchical level condition (step S103). Then, a set of logical items corresponding to each of the normalized extraction conditions is extracted by adding logical items, which are included in the corresponding extract condition in the foregoing unique list of logical items, to each of the normalized extraction conditions obtained as a result of the decomposition (step S104). In the middle part of FIG. 7, the logical item sets of this example are shown.

Next, calculation tables are checked according to calculation table relevance conditions correspondingly to the extracted logical item sets. Thus, calculation tables (hereinafter referred to as "relevant calculation tables") which meet the relevance conditions are detected (step S105). Practically, the following conditions are employed as the calculation table relevance conditions. Incidentally, in the following description, logical items used in the designation of the grouping and the extraction conditions will be referred to as key items. Further, logical items other than the key items will be described as attribute items.

(1) A calculation table including all key items contained in a logical item set and further including at least one attribute item contained in the logical item set is a relevant calculation table.

(2) Further, in case a logical sub-item is designated in a logical item included in a logical item set, the same logical sub-item should be assigned to the logical item of the calculation table.

(3) In case a plurality of calculation tables are defined so as to bear a serial relation, attribute items being relevant to a precedent calculation table are excluded from logical item sets for checking the subsequent calculation tables.

(4) In case a plurality of calculation tables are defined so as to bear a parallel relation, attribute items being relevant to a precedent calculation table are left in logical item sets for checking the subsequent calculation tables.

(5) The foregoing process is repeatedly performed until no attribute items are left in the logical item set checking the subsequent calculation tables or until all the calculation tables are checked.

Further, calculation items of a unit of retrieval, which are those retrieved by performing retrieval of a database once, are determined correspondingly to each of the relevant calculation tables by the following procedure (step S106).

(I) Calculation items corresponding to attribute items contained in the calculation table are first obtained. Then, in case the calculation items have different calculation syntax definitions and selection definition expressions, the grouping of the calculation items is performed so that only the calculation items having the same calculation syntax definition and the same selection definition expression are of the same group.

(II) All the calculation items corresponding to a key item included in the calculation table are then found. Subsequently, the calculation items of the groups corresponding to the attribute items, which are obtained at the foregoing step (I), are added to the found calculation items. The calculation items obtained as a result of this addition are treated as a calculation item set which is a unit of retrieval.

Next, the retrieval request translation processing section 12 expands the item names, which concern the retrieval item list, the designation of grouping and the designation of sorting, into expressions according to the calculation definition expressions of calculation items, which are described by using a physical table and a physical item (step S107). Regarding the normalized extraction conditions, the corresponding item names are similarly expanded into expressions according to the calculation definition expressions of calculation items (step S108). FIG. 8 illustrates an example of this process.

Further, in case a physical table is used in the calculation definition expression as a complementary table, a physical table join definition is obtained according to a reference physical table and the complementary table. Then, the obtained physical table join definition is added to table reference expressions or extraction condition expressions (step S109).

Partial value sets in the logical item level are obtained by substituting the foregoing expressions, which are obtained by the expansion, in instruction elements such as a retrieval item list, a grouping designation expression list, a sorting designation list, an extraction condition expression and a table reference expression, which correspond to the relevant calculation table. Moreover, a normalized query statement, which can be executed on the database 17, is generated (step S110).

As illustrated in a lower part of FIG. 8, a sequence of normalized query statements, which includes a set of all logical item values required to satisfy the designated retrieval request, can be obtained by repeatedly performing the foregoing process a number of times, the number of which is the sum of the number of units of retrieval described in the relevant calculation table, the number of relevant tables corresponding to each normalized extraction condition and the number of the normalized extraction conditions (steps S111 to S113).

The database retrieval processing section 13 has an interface with the database 17 from which data is retrieved. The processing section 13 issues normalized query statements obtained in the retrieval request translation processing section 12 to the database 17. Further, the processing section 13 acquires retrieval data, which represents a result of the retrieval, and then stores the retrieval data in a temporary storage area. This retrieval data temporary storage area may be constituted by a temporary table provided on the database 17, a temporary file provided on a magnetic storage medium, or a storage area on a memory.

The data integration processing section 14 is constituted by including the functions of integrating and processing retrieval data acquired in the database retrieval processing section 13, and the function of editing result data.

Figure 9:
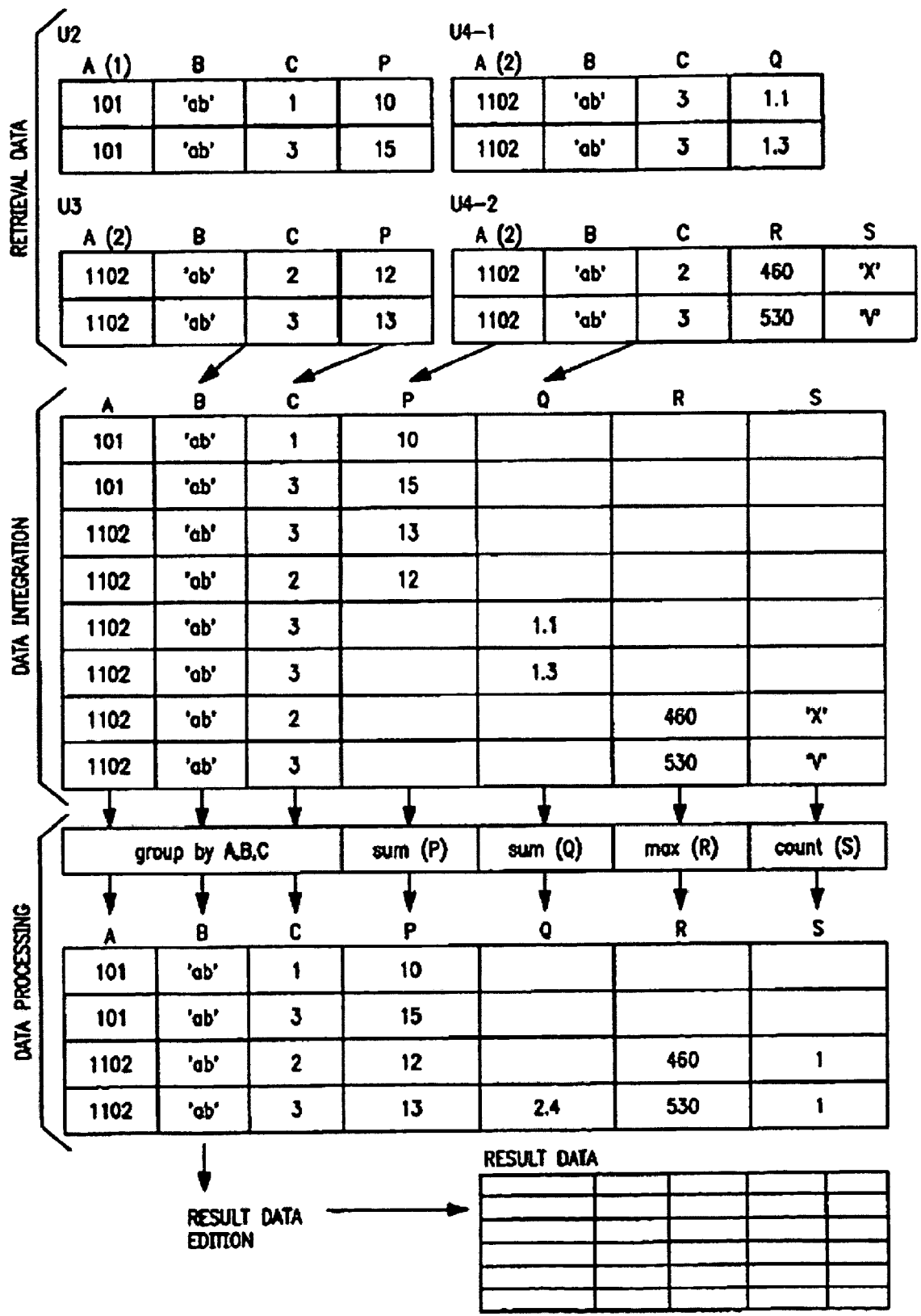
FIG. 9 is a schematic diagram illustrating data integration performed according to the preferred embodiment of the present invention.

FIG. 9 is a schematic diagram illustrating processing performed in the data integration processing section 14. In the data integration processing performed in the section 14, the unnormalized (or redundant) part included among a plurality of retrieval data is removed by disregarding the differences in the normalized retrieval process and the presence of the logical sub-item among the plurality of retrieval data respectively obtained in a divided manner and by integrating the plurality of retrieval data in a single table format as a result of regarding the items, which are generated from the same logical item, to be the same with one another. A table shown in an upper part of FIG. 9 indicates retrieval data obtained by the database retrieval processing section 13. Further, a table shown in a middle part of FIG. 9 indicates a result of integration processing of this retrieval data.

In the data processing, the grouping of the table integrated by the data integration processing is performed according to the grouping designation in the retrieval request. Then, in case the description of the data processing is included in the logical item definition in the data dictionary 16, predetermined data processing is implemented by utilizing the functions of performing a numerical operation, a character string manipulation, a date conversion and a code conversion.

Further, in the result data edition processing, tabulation processes, such as cross tabulation utilizing the exchange between rows and columns and addition of a title and a header are performed according to the designation in the retrieval request. Thus, final result data is generated.

The result data output processing section 15 acquires result data from the data integration processing section 14 and then displays the result data on the screen of the user terminal UT, outputs the result data by printing, outputs the result data as a file, or outputs the result data to applications for performing other kinds of data processing and display processing.

Incidentally, in the user terminal UT and the database administrator terminal DT, for instance, a database administrator uses an editing tool constituted by GUI (Graphical User Interface) and so on. This facilitates the update and maintenance of the definition information. Further, if a user is not familiar with databases, a graphical operating environment facilitates user's work.

Figure 10A:
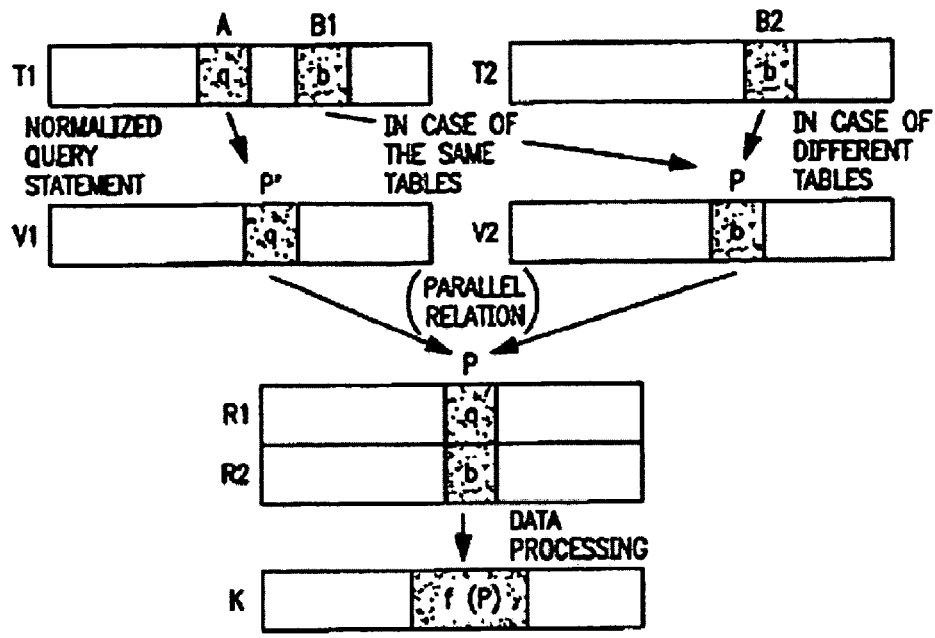
FIGS. 10A and 10B are conceptual diagrams illustrating data structure conversion processing performed according to the preferred embodiment of the present invention.

Next, the retrieval of a database including an unnormalized data structure, which is performed by the data retrieval apparatus 1, will be described hereinbelow. FIGS. 10A, 10B, 11A and 11B are conceptual diagrams illustrating data integration processing. FIG. 10A illustrates an example of the case (column integration) wherein different physical items are integrated into the same logical item. The example shown in this figure employs calculation tables V1 and V2 that are in the parallel relation. The calculation table V1 is defined so that a specific logical item P refers to a physical item A (whose value is a) on a physical table T1, while the calculation table V2 is defined so that the logical item P refers to a physical item B1 (whose value is b) on the same table T1 or to a physical item B2 (whose value is b) on a different table T2. Consequently, both of records respectively including values a and b in the logical item P are generated as retrieval data. Final result data f(P) is obtained by performing data processing on this retrieval data. Consequently, items arranged in a column direction on the database are rearranged in a row direction. Arbitrary operation can be performed on the resultant items.

Figure 10B:
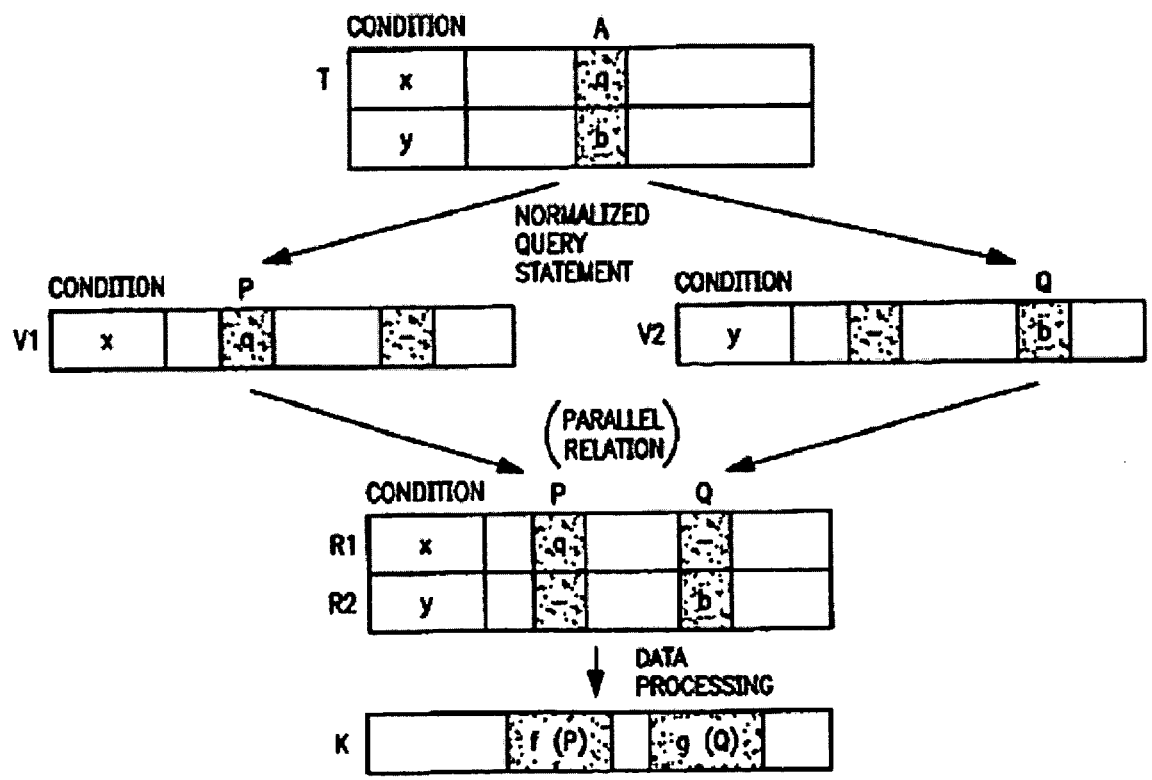

FIG. 10B illustrates an example of the case (column decomposition) wherein a same physical item is decomposed into different logical items. The example shown in this figure employs calculation tables V1 and V2 that are in the parallel relation. The calculation table V1 is defined so that a specific logical item P refers to a physical item A (whose value is a) on a physical table T only under the condition x, while the calculation table V2 is defined so that a specific logical item Q refers to a physical item A (whose value is b) on the same table T only under the condition y. Consequently, both of a record including a value a in the logical item P under the condition x and a record including a value b in the logical item Q under the condition y are generated as retrieval data. Final result data f(P) and g(Q) are obtained by performing data processing on this retrieval data. Consequently, items arranged in a row direction on the database are rearranged in a column direction. Arbitrary operation can be performed on the resultant items. Incidentally, this embodiment employs the technique of describing the conditions in the selection definition expression of the calculation item instead of the calculation table. However, even in case the conditions are described in the calculation table, the same effects are actually obtained because a plurality of units of retrieval are automatically generated according to the selection definition expression.

Figure 11A:
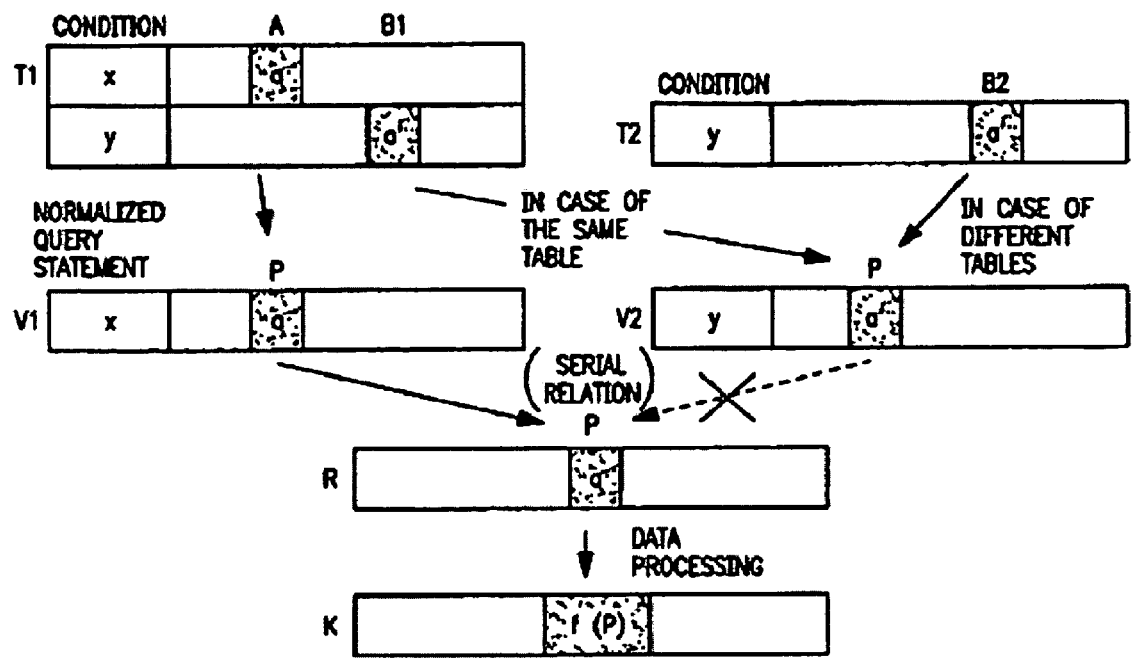
FIGS. 11A and 11B are conceptual diagrams illustrating data structure conversion processing performed according to the preferred embodiment of the present invention.

FIG. 11A illustrates an example of the case (row selection) of selecting a single logical item, whose content does not overlap with those of the others, from physical items, whose contents overlap one another, according to specific conditions. The example shown in this figure employs calculation tables V1 and V2 that are in the serial relation. The calculation table V1 is defined so that a specific logical item P refers to a physical item A (whose value is a) on a physical table T1 only under the condition x, while the calculation table V2 is defined so that the logical item P refers to a physical item B1 (whose value is a') on the same table T1 or to a physical item B2 (whose value is a') on a different table T2 only under the condition y. Consequently, only records each including a physical item A (whose value is a) in the logical item P of the retrieval data under the condition x are generated. Moreover, the physical item B1 or B2, whose contents overlap with those of the other, is removed. Final result data f(P), whose content does not overlap with those of the others, is obtained by performing data processing on this retrieval data. Consequently, items arranged in a column direction on the database are rearranged in a row direction. Arbitrary operation can be performed on the resultant items. At that time, the conditions may include the presence/absence of set classification and extraction conditions described in the retrieval request in addition to the condition values. For example, in case sales data organized by customer and sales data organized by both customer and commodity are provided, the present invention realizes the function of optimizing retrieval object. For instance, when the retrieval request does not request sales data organized by customer, retrieval is performed on the former sales data whose quantity is less than that of the latter sales data. Conversely, when the sales data organized by customer is requested by the retrieval request, retrieval is performed on the latter sales data.

Figure 11B:
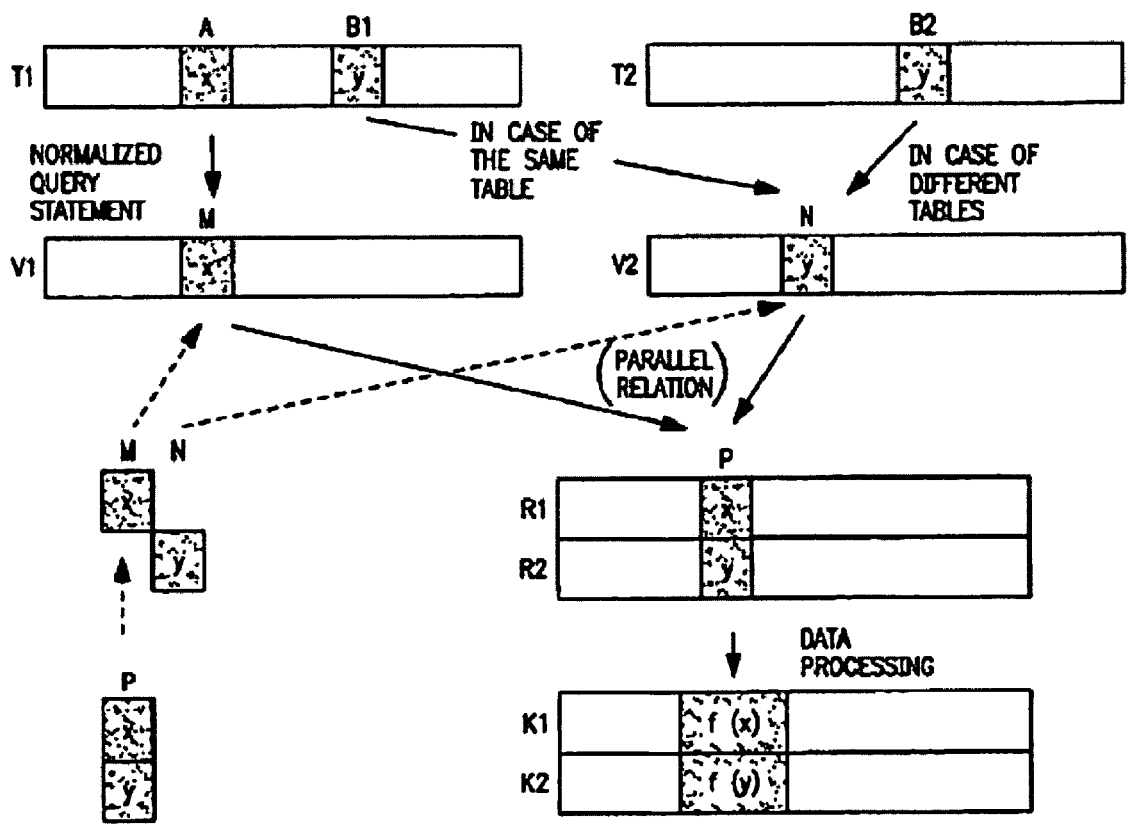

FIG. 11B illustrates an example of the case (key value selection) wherein different physical items are selected according to a key value and the selected physical items are aggregated into a single logical item. In case of the example shown in this figure, a logical sub-item M corresponding to a selection condition value x and another logical sub-item N corresponding to a selection condition value y are defined as lower-order items of the logical item P that is a key item. This example prepares calculation tables V1 and V2 that are in the parallel relation. The calculation table V1 is defined so that the logical sub-item M refers to a physical item A (whose value is x) on a physical table T1, while the calculation table V2 is defined so that the logical sub-item N refers to a physical item B1 (whose value is y) on the same table T1 or to a physical item B2 (whose value is y) on a different table 12. Consequently, when the value x is designated as the key condition value for the logical item P, M is employed as the logical sub-item corresponding to the logical item P. Thus, the calculation table V1 including the logical sub-item M is employed as the relevant calculation table, and the physical item A is referred to. On the other hand, when the value y is designated as the key condition value, the physical item B1 or B2 is similarly referred to. When data is acquired, the physical items A and B1 (or B2) are integrated into the single logical item P by following the same procedure as that in the case (column integration) of integrating different items into a same item.

Figure 12:
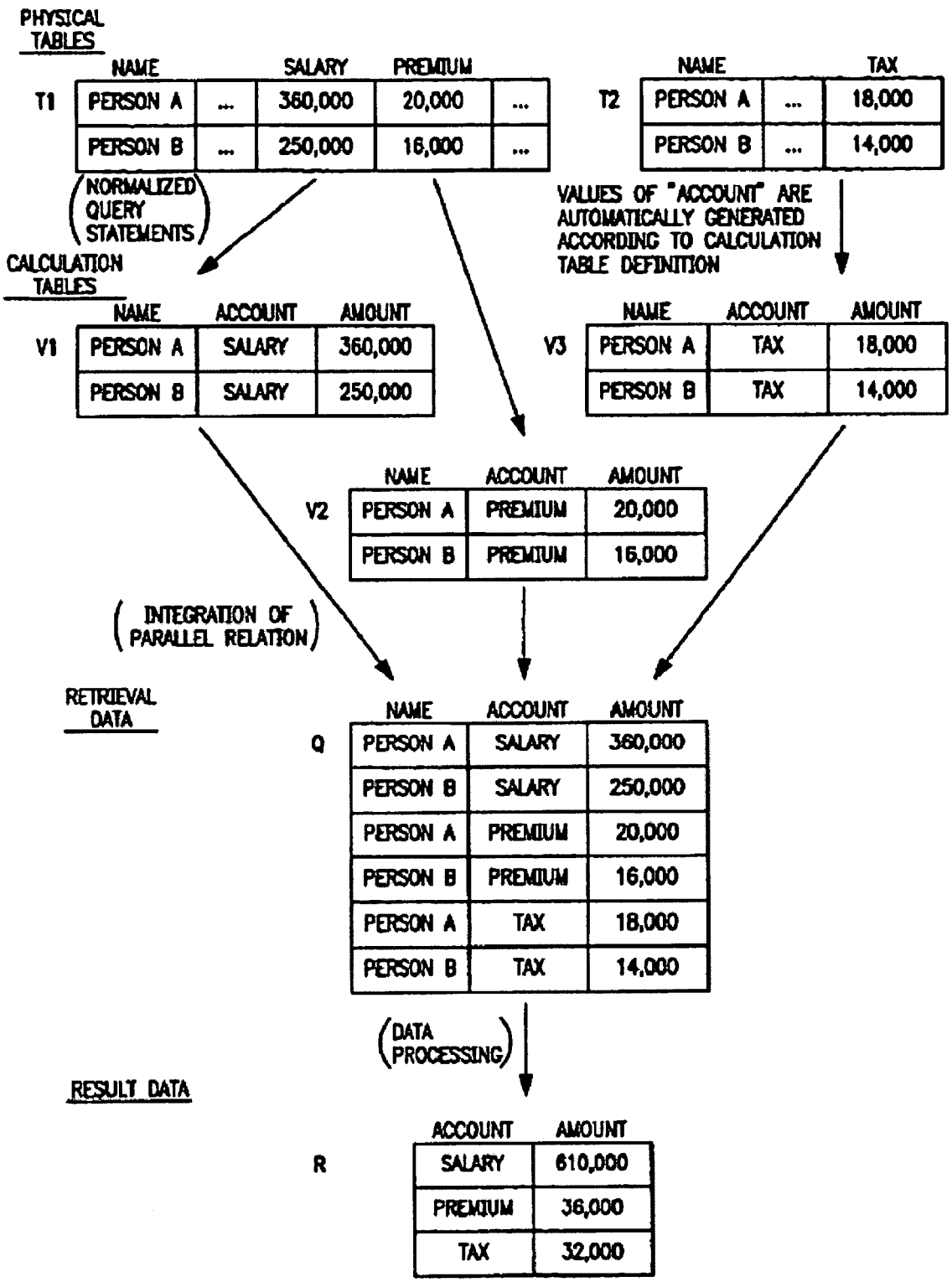
FIG. 12 is a schematic diagram illustrating an example of data retrieval performed according to the preferred embodiment of the present invention.

FIGS. 12 to 15 are schematic diagrams each illustrating an example of actual data retrieval. FIG. 12 illustrates an example of the process in which result data is obtained in response to a retrieval request issued to two physical tables T1 and T2. In this example, three calculation tables V1, V2 and V3, which are in the parallel relation, are integrated, so that retrieval data Q is obtained. Then, result data R representing "a total money amount list organized by title of account" is obtained as a result of performing data processing on the retrieval data Q. Namely, FIG. 12 illustrates a process to be performed in the case (column integration) wherein different physical items are integrated into a same logical item.

Figure 13:
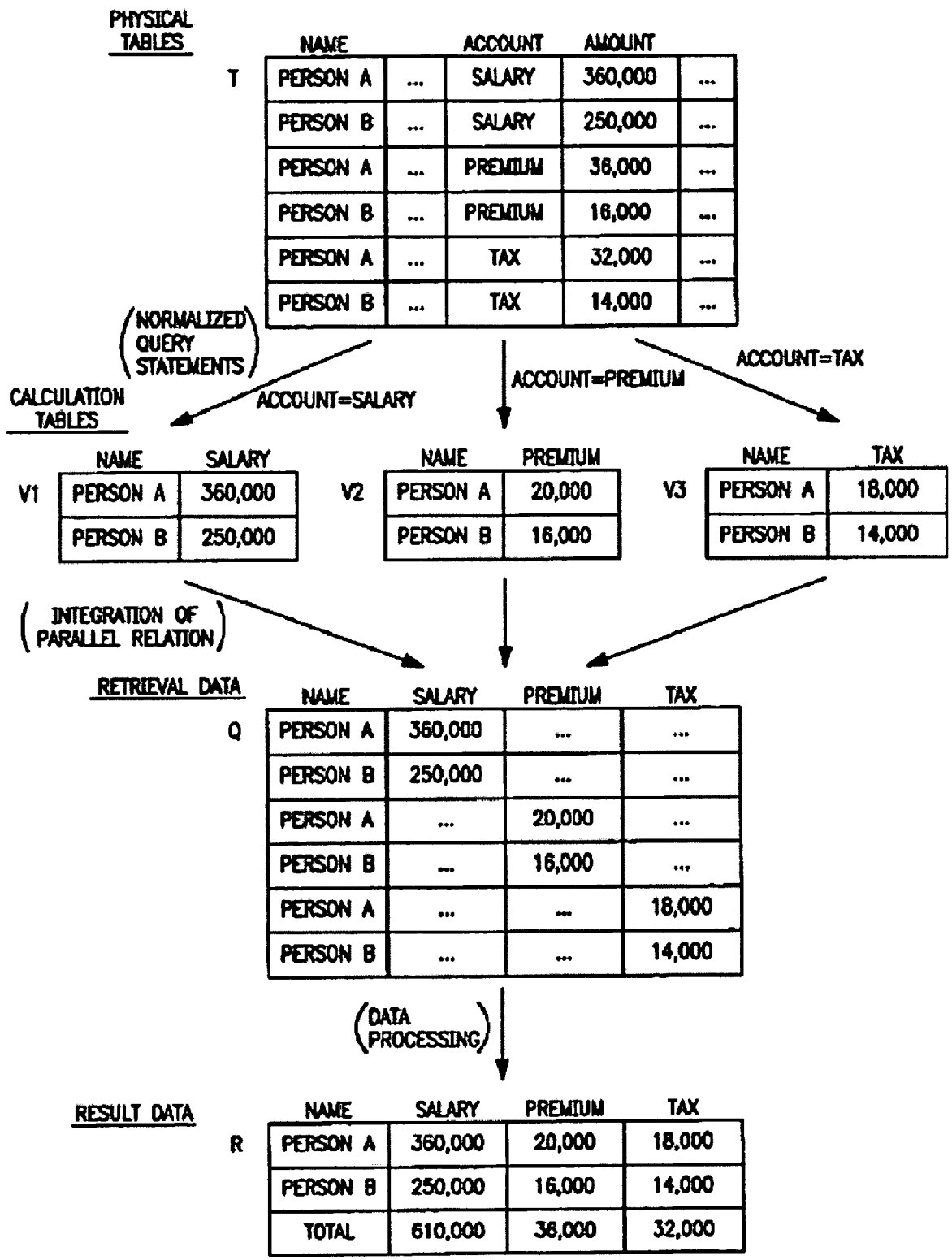
FIG. 13 is a schematic diagram illustrating another example of data retrieval performed according to the preferred embodiment of the present invention.

FIG. 13 illustrates an example of the process in which result data is obtained in response to a retrieval request issued to a physical table T. In this example, three calculation tables V1, V2 and V3, which are in the parallel relation and correspond to the conditions "a title of account=a salary", "a title of account=an insurance premium" and "a title of account=a tax", respectively, are integrated, so that retrieval data Q is obtained. Then, result data R representing "a detailed salary list organized by person" is obtained as a result of performing data processing on the retrieval data Q. Namely, FIG. 13 illustrates a process to be performed in the case (column decomposition) wherein a same physical item is decomposed into different logical items under certain conditions.

Figure 14:
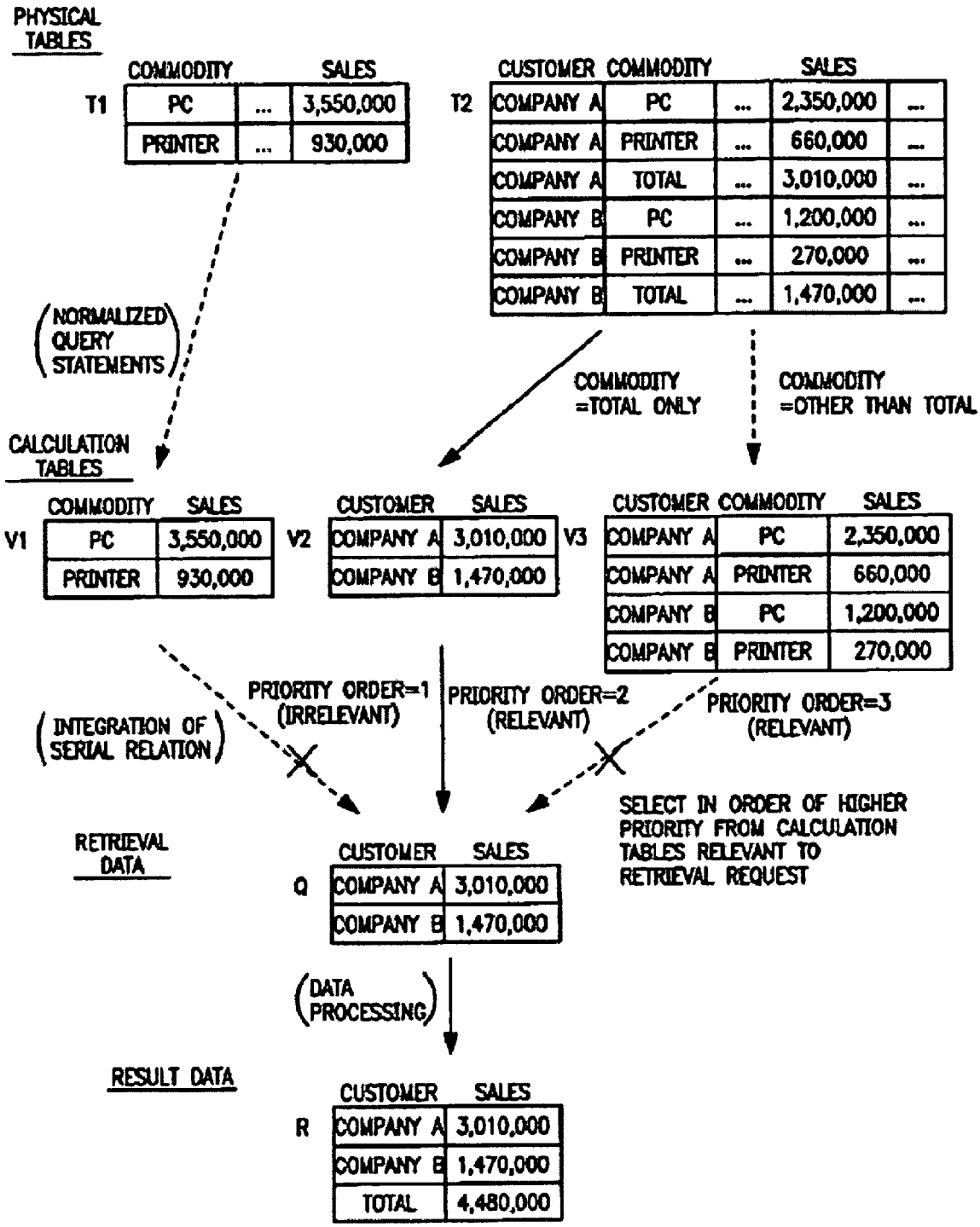
FIG. 14 is a schematic diagram illustrating another example of data retrieval performed according to the preferred embodiment of the present invention.

FIG. 14 illustrates another example of the process in which result data is obtained in response to a retrieval request issued to two physical tables T1 and T2. In this example, three calculation tables V1, V2 and V3, which are in the serial relation, are integrated, so that retrieval data Q is obtained. Then, result data R representing "a sales list organized by customer" is obtained as a result of performing data processing on the retrieval data 9. Namely. FIG. 14 illustrates a process to be performed in the case (row selection) wherein physical items, whose contents overlap with one another, are integrated into a single logical item under certain conditions.

Figure 15:
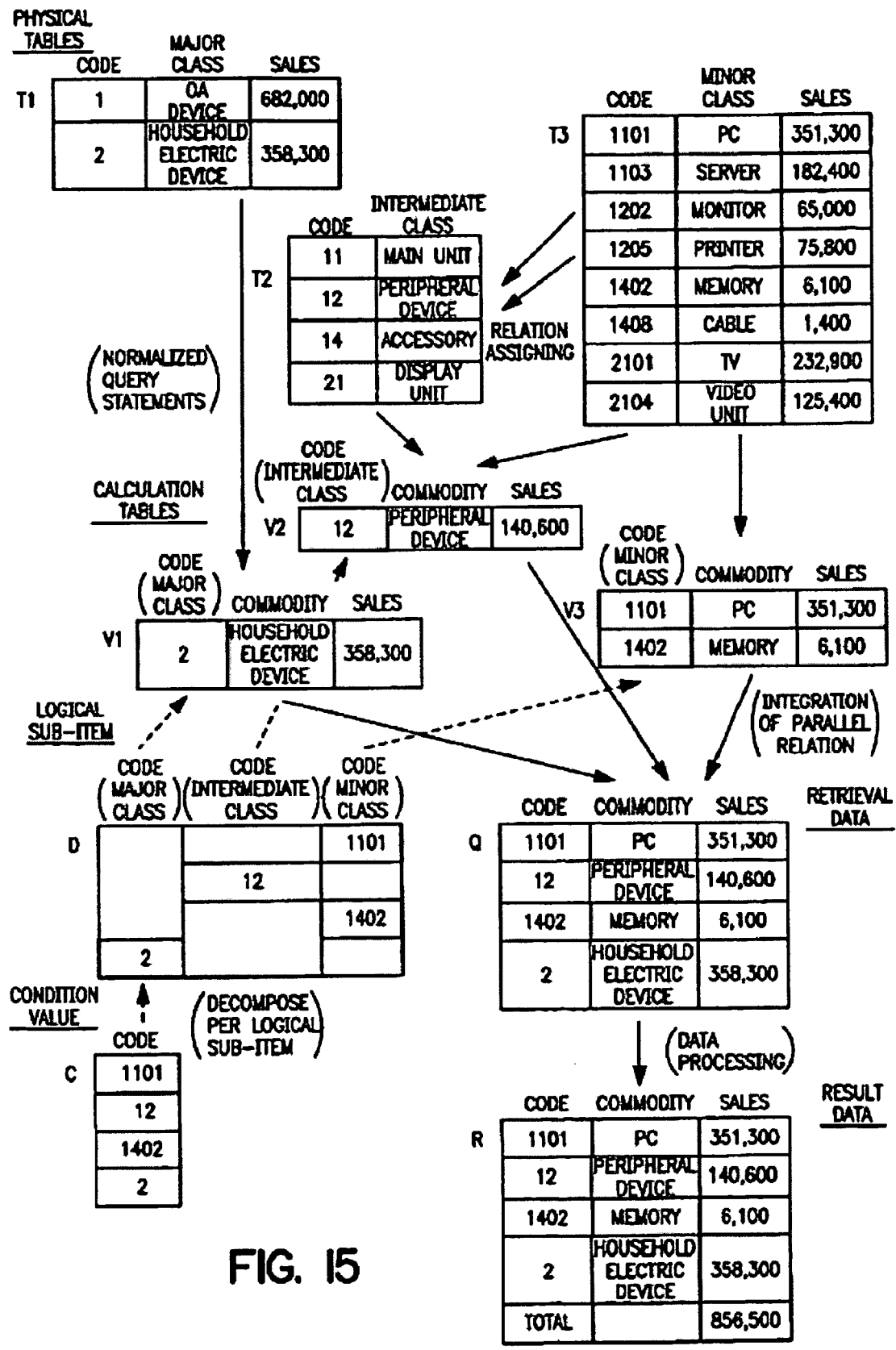
FIG. 15 is a schematic diagram illustrating another example of data retrieval performed according to the preferred embodiment of the present invention.

FIG. 15 illustrates an example of the process in which result data is obtained in response to a retrieval request issued, to three physical tables T1, T2 and T3. In this example, three calculation tables V1, V2 and V3, which are in the parallel relation and based on a logical sub-item D obtained from the condition value C described in the retrieval request by decomposition, are integrated, so that retrieval data Q is obtained. Then, result data R is obtained as a result of performing data processing on the retrieval data Q. Namely, FIG. 15 illustrates a process to be performed in the case (key value selection) wherein different physical items are selected according to a key value and then the different physical items are aggregated to a single logical item.

As described above, when retrieval is requested, the data retrieving apparatus 1 of this embodiment can automatically compose a necessary process according to the data dictionary 16 by preliminarily registering definition information, which includes information on the basic logic for the retrieval and the basic patterns of the relation among original data, in the data dictionary 16.

Further, the complex unnormalized data structure stored in the database can be directly retrieved by a user according to the data dictionary 16 as a virtually normalized data structure which can be designated as a retrieval object and a retrieval condition. Thus, as opposed to the conventional techniques, this embodiment can prevent occurrences of the problems that revision of the existing data structure and data conversion require enormous work and that the, entire structure is frequently changed owing to the necessity of exceptional data and retrievals thereof.

Further, this embodiment enables data retrieval utilizing an existing general-purpose database retrieving tool which depends upon language functions attached to a database, without separately developing application programs for individual databases and employing primitive techniques by which, for example, a user processes raw data after the raw data is extracted.

Furthermore, according to this embodiment, a database administrator edits the data dictionary 16 and thus does not need to construct systems according to individual users' needs or correspondingly to each data source, differently from the case of employing the conventional techniques. Thus, this embodiment considerably reduces loads upon introducing a retrieval tool or upon performing data maintenance.

Moreover, according to this embodiment, the apparatus can directly manipulate data of a complex structure by using the data dictionary 16 which incorporates high-level data processing/editing logic. Further, the apparatus has navigating assistance functions which enable data retrieval in response to users' dynamic needs.

Furthermore, this embodiment enables retrieval of data of complex structures from the database without processing such data. The complex structures of such data include, for example, what is called a "summary structure" including the relation between the total money amount list and the detailed salary list, a "multi-level hierarchical structure" having levels such as the major, intermediate and minor classes, and a "decentralized structure" organized by, for instance, department.

Moreover, the use of the navigating, assistance functions, by which visual hierarchical display of data is provided, permits users to make comfortable accesses to desired data in a database, which stores data of the multi-level hierarchical structure, without caring about the physical structure of the database.

Further, the utilization of selection condition values, which are related to logical sub-items described in a retrieval request, makes it possible to treat a set of plural key items, which bear the hierarchical relation among, for instance, the major, intermediate and minor classes, as a single hierarchical type item. Thus, when the database is used, the structure of data included therein is, simplified. Consequently, users' convenience is exceedingly enhanced.

Additionally, the application of the techniques of this embodiment to OODB makes a data retrieving apparatus, practical for retrieving data from a very large database, without reduction in the processing efficiency thereof and without requiring time and labor to convert the data structure.

The present invention can be implemented as a data retrieving system having a plurality of computer apparatuses, for example, a data retrieving server acting as a data retrieving apparatus, and plural client servers acting as request sources, which are bidirectionally communicably connected to one another through public networks, such as Internet, serving as communication circuits.

In this case, the data retrieving server is placed as, for instance, an search engine for a plurality of very large databases in a network environment. The data retrieving server is constituted by building databases, which are the same as the foregoing data dictionary 16 and database 17, respectively, in an internal or external storage device of a computer system. The data retrieving server further has a communication control section for communicating with the client servers, through the public networks. Moreover, the data retrieving server has a retrieval request designation control section 11, a retrieval request translation processing section 12, a database retrieval processing section 13, a data integration processing section 14 and a result data output processing section 15, like the foregoing data retrieving apparatus 1 does.

Similarly, each of the client servers has a communication control section for transmitting a retrieval request to the data retrieval server and receiving a corresponding retrieval result. Each of the client servers further has functional blocks which are similar to the retrieval request designation control section 11 and the result data output processing section 15.

The data retrieving system is different from the foregoing data retrieving apparatus 1 in that this system has the communication control sections for controlling communication. Each of the client servers is adapted so as to transmit a retrieval request, which is issued from the retrieval request designation control section 11, to the data retrieving server provided on the public network through the communication control section. Further, each of the client servers is adapted so as to receive a retrieval result from the data retrieving server through the communication control section and input the received result to the result data output processing section 15.

On the other hand, the data retrieving server is adapted so as to receive a retrieval request from the client server through the communication control section and input the received retrieval request to the retrieval request designation control section 11 and further adapted to transmit a retrieval result received from the result data output processing section 15 to the client server through the communication control section. Consequently, the data retrieving server can achieve advantageous effects equivalent to those of the foregoing data retrieving apparatus 1.

Further, the fusion of the data retrieving servers and what is called an agent technique developed in Internet environment realizes a data retrieving system that can automatically retrieve data in response to retrieval requests from the plurality of client servers.

Thus, the data retrieving system as described above has high flexibility. Further, the optimum system for a very large database can be constructed. Moreover, processing time required for retrieving data is decreased. The processing cost of the entire system can be considerably reduced.

As is apparent from the foregoing description, the present invention achieves an intrinsic advantageous effect that a physically unnormalized data structure can be treated as a logically normalized data structure. Thus, the present invention enables a general-purpose data retrieval from a database which is so built as to include an unnormalized data structure.

While the present invention has been described in terms of the preferred embodiment and the modification thereof, the invention is not to be limited thereto, but can be embodied in various ways without departing from the principle of the invention as defined in the appended claims.

What is claimed is:

1. A data retrieving method comprising:
performing a syntax analysis of a retrieval request from a user according to data definition information in a data dictionary so as to convert the retrieval request into a query statement which is executable by a database, wherein
the database comprises an unnormalized data structure that violates one or more of (i) a first normal form condition, (ii) a second normal form condition, and (iii) a third normal form condition; and
the data definition information in the data dictionary is for representing said unnormalized data structure as a logically normalized data structure, wherein the data dictionary comprises one or more display tables and a plurality of logical items, wherein a display table in said one or more display tables comprises a plurality of display items and wherein each display item in said plurality of display items corresponds to a logical item in the plurality of logical items;
executing said query statement relative to the database so as to obtain an intermediate retrieval result; and
editing the obtained intermediate retrieval result according to said data definition information so as to generate a final retrieval result corresponding to said retrieval request.

2. The data retrieving method of claim 1, wherein each logical item in said plurality of logical items is represented by a logical item type in a plurality of logical item types.

3. The data retrieving method of claim 2, wherein said plurality of logical item types includes any combination of a numerical type, a currency type, a character string type, a code type, a hierarchical code type, a time type, a postal code type, a telephone number type, a voice type, an image type, and a dynamic image type.

4. The data retrieving method of claim 1, wherein the data dictionary further comprises a calculation table which is applied to a specific display table in said one or more display tables.

5. The data retrieving method of claim 4, wherein the calculation table comprises a set of calculation items and wherein each calculation item in said set of calculation items corresponds to a logical item in said plurality of logical items.

6. The data retrieving method of claim 5, wherein a calculation item in the set of calculation items comprises a calculation syntax and a calculation definition expression.

7. The data retrieving method of claim 1, wherein the data dictionary further comprises a plurality of calculation tables which is applied to a single display table in said one or more display tables.

8. The data retrieving method of claim 1, wherein said retrieval request comprises a selection of one or more display items from among said one or more display tables.

9. The data retrieving method of claim 8, wherein each logical item in said plurality of logical items is classified as a key candidate item or an attribute candidate item, and for each respective display item in said one or more display items in said retrieval request that corresponds to a logical item that is a key candidate item, the performing comprises obtaining a corresponding extraction condition for said each respective display item.

10. The data retrieving method of claim 9, wherein the corresponding extraction condition for a display item in the one or more display items in the retrieval request is provided by said user.

11. The data retrieving method of claim 10, wherein the retrieval request comprises a selection of one or more display items from among said one or more display tables and wherein said performing comprises:
normalizing the corresponding extraction condition for each display item in the one or more display items;
converting each display item in the retrieval request to a corresponding logical item in said one or more logical items thereby generating a plurality of logical items; and
eliminating redundant logical items in said plurality of logical items.

12. The data retrieving method of claim 1, wherein the retrieval request comprises a selection of one or more display items from among said one or more display tables and wherein said performing comprises:
converting each display item in the retrieval request to a corresponding logical item in said logical items thereby generating a plurality of logical items; and
eliminating redundant logical items in said plurality of logical items.

13. The data retrieving method of claim 1, wherein said retrieval request includes a data extracting condition for restrictively specifying data to be retrieved, and wherein said query statement is obtained by normalizing a logical description in the data extracting condition by a first-order predicate logic according to said data definition information.

14. The data retrieving method of claim 1, wherein said final retrieval result is obtained by eliminating data redundancy included in the intermediate retrieval result.

15. The data retrieving method of claim 1, wherein said retrieval request is converted into the query statement by replacing a schema and syntax of said retrieval request with a corresponding schema and syntax which is executable by said database.

16. The data retrieving method of claim 1, wherein said retrieval request is converted into the query statement by replacing a syntax pattern of said retrieval request with a corresponding query statement pattern which is executable by said database.

17. A data retrieving apparatus implemented on a computer, said data retrieving apparatus comprising:
a database built so as to include an unnormalized data structure that violates one or more of (i) a first normal form condition; (ii) a second normal form condition, and (iii) a third normal form condition;
a data dictionary holding data definition information for representing said unnormalized data structure as a logically normalized data structure, wherein the data dictionary comprises one or more display tables and a plurality of logical items, wherein a display table in said one or more display tables comprises a plurality of display items and wherein each display item in said plurality of display items corresponds to a logical item in the plurality of logical items;
a retrieval request input section for assisting an input of a retrieval request from a user according to said data dictionary;
a retrieval request translation processing section for performing a syntax analysis of said retrieval request according to said data definition information upon completion of the input of said retrieval request so as to convert said retrieval request into one or more query statements which are executable by said database;
a database retrieval processing section for issuing said one or more query statements to said database so as to acquire retrieval data composed of one or more intermediate results of execution of said one or more query statements; and
a data integration processing section for integrating said one or more intermediate results so as to generate final result data corresponding to said retrieval request.

18. The data retrieving apparatus of claim 17, wherein said retrieval request input section dynamically adds, to said data dictionary, information specified by the user on a logical item type used for an extraction condition in the retrieval request.

19. The data retrieving apparatus of claim 17, wherein said data dictionary includes the data definition information having selectably presented display information when assisting said input, a query statement pattern for converting the retrieval request to one or more query statements that are executable by said database, and wherein physical information in said database is related for each of the logical items representing a data unit in said retrieval request.

20. The data retrieving apparatus of claim 17, wherein a display item in the plurality of display items corresponds to a logical item in said plurality of logical items, the data definition information including a logical sub-item for complementing said logical item, and wherein information on a category in a logical item type for representing the unnormalized data structure as the logically normalized data structure is in said logical sub-item.

21. The data retrieving apparatus of claim 17, wherein said retrieval request input section visibly presents display information on data to be retrieved, according to said data dictionary, and interactively performs a selective input from the user of the retrieval request which includes an extraction condition for extracting the data to be retrieved.

22. The data retrieving apparatus of claim 17, wherein said retrieval request input section designates a display format of said final result data, wherein said display format is included in said retrieval request.

23. The data retrieving apparatus of claim 17, wherein said retrieval request input section generates result data from a plurality of display items, which are selected by the user from display information, such that the plurality of display items employing a common display item as a key item are compounded into said final result data.

24. The data retrieving apparatus of claim 17, wherein said retrieval request translation processing section converts said retrieval request into said one or more query statements by replacing a retrieval request syntax pattern of said retrieval request with a corresponding query statement pattern which is executable by said database.

25. The data retrieving apparatus of claim 17, wherein said retrieval request translation processing section converts the retrieval request into said one or more query statements which are normalized according to a first order predicate logic in a data manipulation language based on predetermined Structure Query Language (SQL).

26. The data retrieving apparatus of claim 17, wherein said database retrieval processing section removes a redundant part found within the one or more intermediate results by integrating items formed from a same logical item in the one or more intermediate results corresponding to said one or more query statements.

27. The data retrieving apparatus of claim 17, wherein
said data integration processing section integrates said one or more intermediate results into a single table, and wherein the grouping of the single table is performed according to a grouping designation in the retrieval request.

28. The data retrieving apparatus of claim 17, wherein the retrieval request comprises a plurality of display items and wherein the retrieval request translation processing section comprises:
instructions for converting display items in the retrieval request into a plurality of logical items; and
instructions for generating a unique list of logical items to be included in the final result data.

29. The data retrieving apparatus of claim 28, wherein said data integration processing section integrates items in said one or more intermediate results into a single table, and wherein items in the one or more intermediate results that are generated from a same logical item in said unique list of logical items are placed in a same column in said single table.

30. The data retrieving apparatus of claim 29, wherein items in the one or more intermediate results that are generated from the same logical item in said unique list of logical items are deemed to be a same type when generating said single table.

31. The data retrieving apparatus of claim 29, wherein each respective intermediate result in said one or more intermediate results corresponds to a query in said one or more query statements.

32. The data retrieving apparatus of claim 17, wherein said database retrieval processing section performs data processing and tabulation on the retrieval data according to designation of a display format concerning the final result data when the designation of the display format is included in the retrieval request.

33. The data retrieving apparatus of claim 17, wherein said database is constructed as a predetermined object-oriented database.

34. A data retrieving system comprising the data retrieving apparatus of claim 17 and a plurality of retrieval request source devices, wherein said data retrieving apparatus is bidirectionally communicably connected to said retrieval request source devices, and wherein said data retrieving apparatus is constituted so as to acquire a retrieval request issued from each of said retrieval request source devices and transmit a corresponding retrieval result to a corresponding retrieval request source device.

35. The data retrieving system of claim 34, wherein the retrieval request is inputted to said data retrieving apparatus through an agent function.

36. The data retrieving apparatus of claim 17, wherein said retrieval request translation processing section converts said retrieval request into said one or more query statements by replacing a schema and syntax of said retrieval request with a corresponding schema and syntax which is executable by said database.

37. The data retrieving apparatus of claim 17, wherein a plurality of logical items types includes any combination of a numerical type, a currency type, a character string type, a code type, a hierarchical code type, a time type, a postal code type, a telephone number type, a voice type, an image type, and a dynamic image type.

38. The data retrieving apparatus of claim 17, wherein the data dictionary further comprises a calculation table which is applied to a single display table in said one or more display tables.

39. The data retrieving apparatus of claim 38, wherein a calculation table comprises a set of calculation items and wherein each calculation item in said set of calculation items corresponds to a logical item in said logical items.

40. The data retrieving apparatus of claim 39, wherein a calculation item in the calculation table comprises a calculation syntax and a calculation definition expression.

41. The data retrieving apparatus of claim 17, wherein the data dictionary further comprises a plurality of calculation tables which are applied to a specific display table in said one or more display tables.

42. The data retrieving apparatus of claim 17, wherein said retrieval request comprises a selection of one or more display items from among said one or more display tables.

43. The data retrieving apparatus of claim 42, wherein each logical item defined by a plurality of logical item types is classified as a key candidate item or an attribute candidate item, and for each respective display item in said one or more display items in said retrieval request that corresponds to a logical item that is a key candidate item, the syntax analysis comprises obtaining a corresponding extraction condition for said each respective display item.

44. The data retrieving apparatus of claim 43, wherein the corresponding extraction condition for a display item in the one or more display items in the retrieval request is provided by said user.

45. The data retrieving apparatus of claim 17, wherein the retrieval request comprises a selection of one or more display items from among said one or more display tables and wherein said performing comprises:
normalizing an extraction condition for each display item in the display items;
converting each display item in the retrieval request to a corresponding logical item in said one or more logical items thereby generating a plurality of logical items; and
eliminating redundant logical items in plurality of logical items.

46. The data retrieving apparatus of claim 17, wherein the retrieval request comprises a selection of one or more display items from among said one or more display tables and wherein said syntax analysis comprises:

converting each display item in the retrieval request to a corresponding logical item in said logical items thereby generating a plurality of logical items; and eliminating redundant logical items in said plurality of logical items.

47. A storage medium comprising a program, which is executable by a computer apparatus, the storage medium further comprising:

a database built so as to include an unnormalized data structure that violates one or more of (i) a first normal form condition, (ii) a second normal form condition, and (iii) a third normal form condition; and a data dictionary holding data definition information for converting said unnormalized data structure to a logically normalized data structure, wherein the data dictionary comprises one or more display tables and a plurality of logical items, wherein a display table in said one or more display tables comprises a plurality of display items and wherein each display item in said plurality of display items corresponds to a logical item in the plurality of logical items;

wherein said program causes the computer apparatus to execute the steps of:

assisting an input of a retrieval request from a user according to said data dictionary;

performing a syntax analysis of said retrieval request according to said data definition information upon completion of the input of said retrieval request so as to convert said retrieval request into one or more query statements which are executable by said database;

issuing said one or more query statements to said database so as to acquire retrieval data composed of one or more results of execution of said one or more query statements; and editing said retrieval data so as to generate result data corresponding to said retrieval request.

* * * * *